US012292629B2

(12) United States Patent
Zhou et al.

(10) Patent No.: US 12,292,629 B2
(45) Date of Patent: May 6, 2025

(54) DISPLAY MODULE AND DISPLAY APPARATUS

(71) Applicant: Xiamen Tianma Micro-Electronics Co., Ltd., Xiamen (CN)

(72) Inventors: Wenqi Zhou, Xiamen (CN); Minglong Wang, Xiamen (CN); Yan Yang, Xiamen (CN); Caijiao Zhong, Xiamen (CN); Junyi Li, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/073,312

(22) Filed: Dec. 1, 2022

(65) Prior Publication Data

US 2024/0069370 A1     Feb. 29, 2024

(30) Foreign Application Priority Data

Aug. 31, 2022  (CN) .......................... 202211052060.9

(51) Int. Cl.
*G02F 1/13* (2006.01)
*G02F 1/1335* (2006.01)
*G02F 1/1343* (2006.01)

(52) U.S. Cl.
CPC ...... *G02F 1/1323* (2013.01); *G02F 1/133512* (2013.01); *G02F 1/133531* (2021.01); *G02F 1/134309* (2013.01)

(58) Field of Classification Search
None
See application file for complete search history.

(56) References Cited

U.S. PATENT DOCUMENTS

| 2008/0002110 | A1* | 1/2008 | Choi ................. G02F 1/133514 349/106 |
| 2009/0102990 | A1* | 4/2009 | Walton ................. H04N 13/312 349/104 |
| 2010/0103148 | A1* | 4/2010 | Okazaki ............... G09G 3/3648 345/204 |
| 2017/0045763 | A1* | 2/2017 | Murao ...................... G02F 1/29 |

(Continued)

FOREIGN PATENT DOCUMENTS

| CN | 105549236 A | 5/2016 |
| CN | 106646954 A | 5/2017 |

(Continued)

*Primary Examiner* — Shan Liu
(74) *Attorney, Agent, or Firm* — Anova Law Group, PLLC

(57) ABSTRACT

A display module and a display apparatus are provided in the present disclosure. The display module includes a backlight assembly and a display anti-peep assembly. The display anti-peep assembly is on a light-exiting side of the backlight assembly; and the display anti-peep assembly includes a display assembly and an anti-peep assembly; and the anti-peep assembly at least includes a plurality of light-blocking parts which is arranged along a direction in parallel with a plane where the display module is located. The display module further includes a first display mode and a second display mode. In the first display mode, the anti-peep assembly is in an operating state, and a light-exiting angle of the anti-peep assembly is α1; and in the second display mode, the anti-peep assembly is not in an operating state, and the light-exiting angle of the display anti-peep assembly is α2, where α1<α2.

6 Claims, 27 Drawing Sheets

(56) References Cited

U.S. PATENT DOCUMENTS

| | | | |
|---|---|---|---|
| 2018/0059450 A1* | 3/2018 | Li | ...................... G02F 1/133512 |
| 2019/0064608 A1* | 2/2019 | Shiina | ................ G02F 1/134363 |
| 2021/0109388 A1* | 4/2021 | You | ...................... G02F 1/13306 |
| 2021/0173240 A1* | 6/2021 | Li | ...................... G02F 1/133504 |

FOREIGN PATENT DOCUMENTS

| | | | |
|---|---|---|---|
| CN | 208888492 U | | 5/2019 |
| CN | 110780473 A | | 2/2020 |
| CN | 111240082 A | | 6/2020 |
| CN | 214174773 U | | 9/2021 |
| CN | 215813619 U | | 2/2022 |
| CN | 114265220 A | * | 4/2022 |

\* cited by examiner

DISPLAY MODULE AND DISPLAY APPARATUS

CROSS-REFERENCE TO RELATED APPLICATION

This application claims the priority of Chinese Patent Application No. 202211052060.9, filed on Aug. 31, 2022, the content of which is incorporated herein by reference in its entirety.

TECHNICAL FIELD

The present disclosure generally relates to the field of display technology and, more particularly, relates to a display module and a display apparatus.

BACKGROUND

Liquid crystal displays (LCDs) have developed rapidly in recent years and are the dominant displays in current flat panel display market due to their characteristics of small size, low power consumption, and without radiation. Currently, various electronic devices, such as mobile phones, personal digital assistants, digital cameras, computer screens, and notebook computer screens, use liquid crystal displays.

With continuous development of display technology, demands for display manners become more diverse, and users are more aware of the protection of personal privacy. In an open environment with confidentiality requirements, such as entering a withdrawal password, watching private information on public transportation, or business negotiations, the displays need to have a narrow viewing angle to protect personal privacy. Therefore, as an anti-peep manner, anti-peep display technology has become one of important hot issues in the display field.

The anti-peep display products in the existing technology not only have high production costs, but also have the problems of high brightness and poor anti-peep effect due to light leakage when the display picture is viewed from a large viewing angle in an anti-peep mode.

Therefore, there is a need to develop a display module and a display apparatus that can achieve efficient anti-peep effect and reduce costs.

SUMMARY

One aspect of the present disclosure provides a display module. The display module includes a backlight assembly and a display anti-peep assembly. The display anti-peep assembly is on a light-exiting side of the backlight assembly; and the display anti-peep assembly includes a display assembly and an anti-peep assembly; and the anti-peep assembly at least includes a plurality of light-blocking parts which is arranged along a direction in parallel with a plane where the display module is located. The display module further includes a first display mode and a second display mode. In the first display mode, the anti-peep assembly is in an operating state, and a light-exiting angle of the anti-peep assembly is α1; and in the second display mode, the anti-peep assembly is not in an operating state, and the light-exiting angle of the display anti-peep assembly is α2, where α1<α2.

Another aspect of the present disclosure provides a display apparatus including a display module. The display module includes a backlight assembly and a display anti-peep assembly. The display anti-peep assembly is on a light-exiting side of the backlight assembly; and the display anti-peep assembly includes a display assembly and an anti-peep assembly; and the anti-peep assembly at least includes a plurality of light-blocking parts which is arranged along a direction in parallel with a plane where the display module is located. The display module further includes a first display mode and a second display mode. In the first display mode, the anti-peep assembly is in an operating state, and a light-exiting angle of the anti-peep assembly is α1; and in the second display mode, the anti-peep assembly is not in an operating state, and the light-exiting angle of the display anti-peep assembly is α2, where α1<α2.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description to explain the principles of the present disclosure.

DETAILED DESCRIPTION

Figure 1:
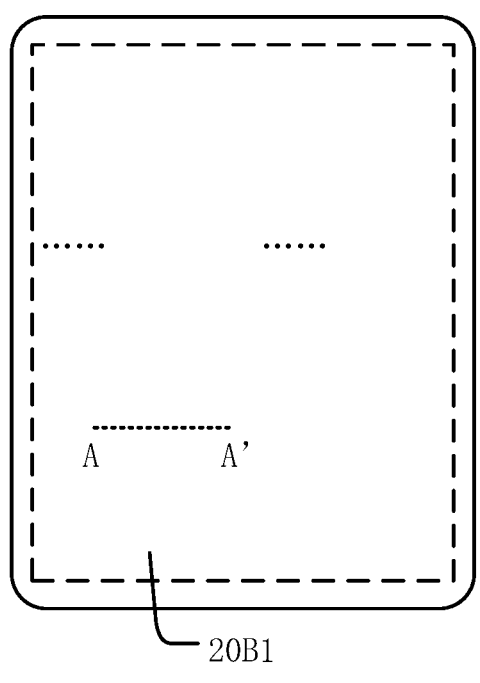
FIG. 1 illustrates a planar structural schematic of a display module according to various embodiments of the present disclosure.

Various exemplary embodiments of the present disclosure are described in detail with reference to accompanying drawings. It should be noted that unless specifically stated otherwise, relative arrangement of assemblies and steps, numerical expressions and values described in such exemplary embodiments may not limit the scope of the present disclosure.

Following description of at least one exemplary embodiment may be merely illustrative and may not be configured to limit the present disclosure and its application or use.

The technologies, methods and apparatuses known to those skilled in the art may not be discussed in detail, but where appropriate, the technologies, methods and apparatuses should be regarded as a part of the present disclosure.

In all examples shown and discussed herein, any specific value should be interpreted as merely exemplary, rather than as a limitation. Therefore, other examples in exemplary embodiment may have different values.

It should be noted that similar reference numerals and letters are configured to indicate similar items in following drawings. Therefore, once an item is defined in one drawing, it does not need to be further discussed in subsequent drawings.

In the existing technology, two types of anti-peep technologies are normally adopted, including on-state (e.g., white) anti-peep technology and off-state (e.g., black) anti-peep technology. When the display apparatus has an anti-peep function, the highest gray-scale picture brightness is used to realize the anti-peep function under a large viewing angle. From the perspective of visual effect, an observer observes a whitish display picture under a large oblique viewing angle. In such way, the display module may be observed in a on state (e.g., white) under the oblique viewing angle, thereby achieving the anti-peep purpose under the oblique viewing angle, which is called on-state anti-peep. The display panel using the on-state anti-peep technology may have complicated process, high cost and poor visual effect. Although the anti-peep function can be realized to a certain extent, specific information such as commonly used black-on-white pictures may still be identified under a large viewing angle, and the anti-peep effect may need to be improved. Therefore, widely used technology in the existing technology is the off-state anti-peep technology that makes corresponding visual effect under a large viewing angle to be black, that is, when a display picture is observed under a large viewing angle, a black picture is observed.

However, in the existing technology, the production cost of the display module using off-state anti-peep is relatively high; and light may be easily leaked when observing from a large viewing angle in the anti-peep mode, causing some display pictures to still be seen at a large viewing angle (such as an oblique viewing angle exceeding 45 degrees or 60 degrees), that is, the anti-peep protection may be poor. In order to solve such problem, in the existing technology, a grating structure may be simply fabricated in a liquid crystal display module, and the anti-peep display effect under a narrow viewing angle may be realized through the light-blocking effect of the grating structure. Although the grating structure can solve the problem of light leakage with a large viewing angle in the anti-peep mode, it cannot be switched to the wide viewing angle display mode. In the existing technology, the display module with a narrow viewing angle may only be realized by the light-blocking effect of the grating structure; and unless the grating structure is removed, the display module may always be in the state of the narrow viewing angle, which may be inconvenient to use in scenarios that content needs to be shared with others or anti-peep is not needed when using by one person, and may reduce the ease of use. That is, such a design may only realize a narrow viewing angle display mode with better anti-peep effect and may not realize free switching between a wide viewing angle and a narrow viewing angle.

To solve above-mentioned problem, the present application provides a display module and a display apparatus, which may realize free switching between wide and narrow viewing angles, achieve efficient off-state anti-peep effect and reduce costs. Embodiments of the display module and the display apparatus provided in the present disclosure are described in detail hereinafter.

Figure 2:
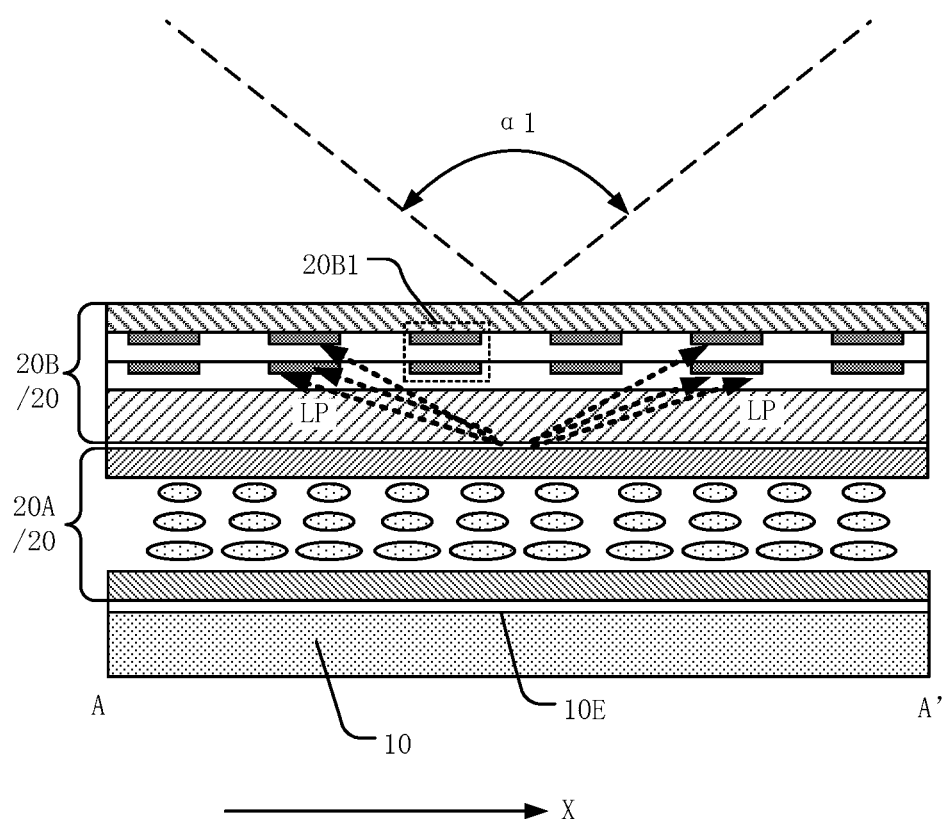
FIG. 2 illustrates a cross-sectional structural schematic along an A-A' direction in FIG. 1.
Figure 3:
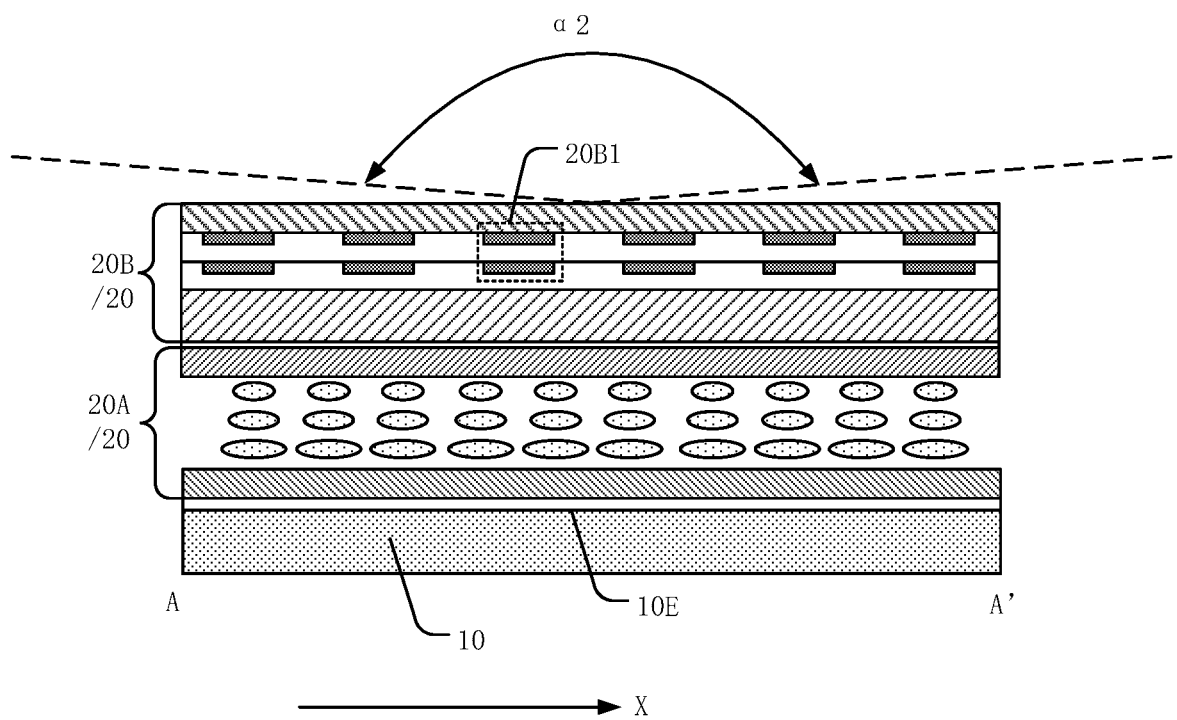
FIG. 3 illustrates another cross-sectional structural schematic along an A-A' direction in FIG. 1.

Referring to FIGS. 1-3, FIG. 1 illustrates a structural schematic of a display module according to various embodiments of the present disclosure; FIG. 2 illustrates a cross-sectional structural schematic along an A-A' direction in FIG. 1; and FIG. 3 illustrates another cross-sectional structural schematic along the A-A' direction in FIG. 1. A display module 000 provided in one embodiment may include a backlight assembly 10 and a display anti-peep assembly 20. The display anti-peep assembly 20 may be on the light-exiting side 10E of the backlight assembly 10.

The display anti-peep assembly 20 may include a display assembly 20A and an anti-peep assembly 20B; the display anti-peep assembly 20B may include at least a plurality of light-blocking parts 20B1; and the plurality of light-blocking parts 20B1 may be arranged along the direction in parallel with the plane of the display module 000.

The display module 000 may include the first display mode and the second display mode.

In the first display mode, the display anti-peep assembly 20B may be in operating, and the light-exiting angle of the display anti-peep assembly 20 may be α1.

In the second display mode, the display anti-peep assembly 20B may not be in operating, and the light-exiting angle of the display anti-peep assembly 20 may be α2, where α1<α2.

For example, the display module 000 provided in one embodiment may be a liquid crystal display module and at least include the backlight assembly 10 and the display anti-peep assembly 20 on the light-exiting side 10E of the backlight assembly 10. It can be understood that the light-exiting side 10E of the backlight assembly 10 in one embodiment can be understood as the side surface of the backlight assembly 10 that emits bright light, and the bright light emitted by the light-exiting side 10E of the backlight assembly 10 may be used as a backlight source of the display anti-peep assembly 10. The structure of the backlight assembly 10 may not be described in detail in one embodiment. In an implementation, the backlight assembly 10 may be either an edge-lit backlight structure or a back-lit backlight structure, which may not be limited in one embodiment; and the structure of the backlight assembly may be understood with reference to the structure of the backlight assembly in the liquid crystal display module in the exiting technology. The display anti-peep assembly 20 on the light-exiting side 10E of the backlight assembly 10 in one embodiment may include the display assembly 20A and the anti-peep assembly 20B. The display assembly 20A may be understood as a structure of a liquid crystal display panel. The display assembly 20A may be used to display desired pictures under the action of the backlight light source provided by the backlight assembly 10.

Optionally, the display assembly 20A and the display anti-peep assembly 20B in one embodiment may be stacked with each other. That is, the display assembly 20A and the display anti-peep assembly 20B may be stacked to form the display anti-peep assembly 20; and the display assembly 20A and the display anti-peep assembly 20B may be fixed by a structure that does not affect light transmission, such as optical glue. Optionally, the display assembly 20A may be disposed between the display anti-peep assembly 20B and the backlight assembly 10 (as shown in FIG. 2 and FIG. 3), or the display anti-peep assembly 20B may be disposed between the display assembly 20A and the backlight assembly 10 (not shown in drawings). Optionally, the display anti-peep assembly 20 may also be other design structures. For example, the display anti-peep assembly 20B may be disposed inside the display assembly 20A and the like (not shown in drawings), which may not be limited in one embodiment. In an implementation, the structure design of the display assembly 20A and the display anti-peep assembly 20B included in the display anti-peep assembly 20 may be performed according to actual design requirements.

Optionally, the display anti-peep assembly 20B in one embodiment may include a liquid crystal cell for adjusting the light exiting angle, or the display anti-peep assembly 20B may also include other structures capable of switching wide and narrow viewing angles, which may not be limited in one embodiment. The display module 000 of one embodiment may include the first display mode and the second display mode. The first display mode may be understood as a narrow viewing angle display mode. That is, when the display module 000 is in the first display mode, the display anti-peep assembly 20B may be in operating, and the anti-peep function of the display anti-peep assembly 20B may need to be activated. For example, the deflection angle of the liquid crystal in the liquid crystal cell included in the display anti-peep assembly 20B may be controlled. In such way, the display picture provided by the display assembly 20A of the display module 000 may be observed to be black under the wide viewing angle, the light exiting angle of the display anti-peep assembly 20 may be only a small angle α1 (as shown in FIG. 2), and the display picture may be observed only when the display module 000 is observed within the angle of α1. The second display mode may be understood as a wide viewing angle display mode. That is, in the second display mode, the display anti-peep assembly 20B may not be in operating, and the anti-peep function of the display anti-peep assembly 20B may not be activated at this point. For example, the deflection angle of the liquid crystal in the liquid crystal box included in the display anti-peep assembly 20B may be controlled. In such way, the display picture provided by the display assembly 20A of the display module 000 may be observed normally even under the wide viewing angle, the light exiting angle of the display anti-peep assembly 20 may be the large angle α2, and the display picture may be observed when the display module 000 is observed in entire range of the angle α2. Therefore, free switching effect between the wide viewing angle display mode and the narrow viewing angle display mode of the display module 000 may be controlled by controlling whether the anti-peep function of the display anti-peep assembly 20B is activated t, which may have high flexibility.

Although the anti-peep display module adopts the liquid crystal cell with light-adjusting function to realize switching of wide and narrow viewing angles, light leakage may be easily occurred when viewing the display picture from the large viewing angle, that is, an oblique viewing angle, in the narrow viewing angle display mode, which may cause the problem of high brightness at the large viewing angle.

In order to solve the above problem, the display anti-peep assembly 20B of one embodiment may be configured to at least include the plurality of light-blocking parts 20B1. The plurality of light-blocking parts 20B1 may be arranged along the direction in parallel with the plane of the display module 000 (the direction X as shown in FIG. 2 and FIG. 3). Optionally, the light-blocking part 20B1 in one embodiment may be formed by a light-blocking structure located at least on a same layer (not shown in drawings), or one light-blocking part 20B1 may also be formed by stacking multiple light-blocking structures located in different layers (for example, the light-blocking part 20B1 indicated by the dotted box in FIGS. 2 and 3 is formed by stacking two light-blocking structures of different layers). Furthermore, optionally, the light-blocking part 20B1 in one embodiment may be a strip-shaped or mesh-shaped structure made of a material that is non-transparent and has strong light-blocking performance. When the light-blocking part 20B1 is a strip-shaped structure, the plurality of light-blocking parts 20B1 may be arranged along the direction in parallel with the plane of the display module 000, so that the light-blocking effect of the display module 000 in one direction (the direction X shown in FIGS. 2 and 3) may be realized. When the light-blocking part 20B1 is a mesh-shaped structure, the plurality of light-blocking parts 20B1 may be arranged in a mesh crossing manner along the direction in parallel with the plane of the display module 000, so that the light-blocking effect of the display module 000 in at least two intersecting directions may be realized. The shape of the light-blocking part 20B1 may not be limited according to various embodiments of the present disclosure.

In one embodiment, the light-blocking part 20B1 may be at least disposed in the display anti-peep assembly 20B of the display module 000, which may be used in conjunction with the light-adjusting cell (such as a liquid crystal light-adjusting cell) of the display anti-peep assembly 20B. In such way, it may not only realize free switching between the first display mode with narrow viewing angle and the second display mode with wide viewing angle, but also make the display module 000 in the second display mode with the narrow viewing angle, through the light-blocking effect of the light-blocking part 20B1, to block leaked light at the large viewing angle in the anti-peep mode, especially the leaked light at the viewing angle greater than or equal to 45 degrees, which may reduce the brightness of the display picture under the large viewing angle and be beneficial for ensuring the anti-peep effect in the anti-peep mode. As shown in FIG. 2, the light rays LP with arrows can be understood as leaked light rays with the large viewing angle in the anti-peep mode. The viewing angle range where the light rays LP are located may be the large viewing angle in the anti-peep mode. Since the light rays LP is at an angle greater than or equal to 45 degrees from the front viewing angle light observed from directly above the display module, the light rays can be understood as the leaked light at the large viewing angle in the anti-peep mode.

Figure 4:
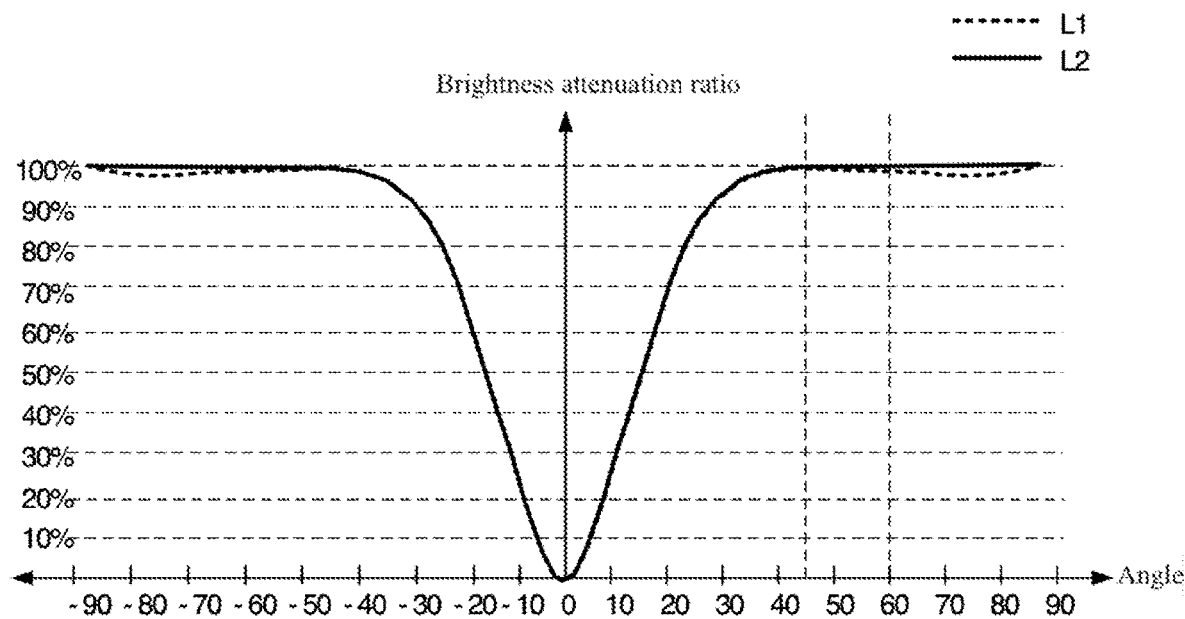
FIG. 4 illustrates a brightness attenuation curve comparison graph of an existing display module and a display module provided by various embodiments of the present disclosure in a narrow viewing angle display mode.

FIG. 4 illustrates a brightness attenuation curve comparison graph of an existing display module and a display module provided by the present disclosure in a narrow viewing angle display mode. The dotted line L1 in FIG. 4 represents the brightness attenuation curve of the display module in the existing technology that uses a liquid crystal cell with a light-adjusting function to realize switching between wide and narrow viewing angles in the narrow viewing angle display mode. The solid line L2 in FIG. 4 represents the brightness attenuation curve of the display module provided in one embodiment in the narrow viewing angle display mode. The abscissa in FIG. 4 represents the viewing angle, 0 degree represents observing the display picture directly above the display module, and the negative angle and positive angle on both sides of 0 degrees indicate that the display picture is observed on the left and right sides of the display module, that is, the oblique viewing angle. The ordinate in FIG. 4 represents the brightness attenuation ratio. The higher the value of the ordinate is, the more brightness attenuation is observed at the viewing angle compared to the positive viewing angle of 0 degrees, that is, the lower the brightness is. The lower the value of the ordinate, the lower the brightness attenuation observed at the viewing angle compared to the positive viewing angle of 0 degrees, that is, the higher the brightness is. It can be seen from the dotted line L1 in FIG. 4, in the display module using the liquid crystal cell with the light-adjusting function to realize wide-narrow switching in the existing technology, in the anti-peep display mode with the narrow viewing angle, the brightness attenuation ratio at the viewing angle of 0-45 degrees shows an increasing trend, that is, viewing the display picture at least at the viewing angle of 45 degrees still has a high anti-peep effect. However, when the display picture is observed at the viewing angle greater than 45 degrees, the brightness attenuation ratio may become smaller, and the brightness may become stronger. That is, when the viewing angle is greater than 45 degrees, there is obvious light leakage on the display picture; and when the viewing angle is greater than 60 degrees, the brightness attenuation ratio may be smaller, and observed light leakage may be more serious. That is, when the designed display module in the existing technology is in the anti-peep display mode with the narrow viewing angle, the phenomenon of light leakage may be serious when the viewing angle is larger than 45 degrees, and the anti-peep effect may be poor. It can be seen from the solid line L2 in FIG. 4 that after the display anti-peep assembly 20B of the display module 000 of the present embodiment adopts the light-blocking part 20B1, in the anti-peep display mode with the narrow viewing angle, the brightness attenuation ratio at the viewing angles of 0-45 degrees may show an increasing trend. That is, at least viewing the display picture at the viewing angle of 45 degrees may still have high anti-peep effect, and when viewing the display picture at the viewing angle greater than 45 degrees, the value of the brightness attenuation ratio may show a constant trend (keep at 100%). That is, the brightness attenuation ratio may have always been maintained at the attenuation ratio under the viewing angle of 45 degrees (compared to the brightness attenuation value within the same viewing angle range indicated by the dotted line L1 in FIG. 4 may have significantly increased, that is, the brightness may have significantly reduced). The use of the light-blocking part 20B1 may make the display picture to be observed at the viewing angle greater than 45 degrees without light leakage, the anti-peep effect may be desirable, and the display picture may be hardly seen. Therefore, the display module 000 of one embodiment may not only realize free switching between the first display mode with the narrow viewing angle and the second display mode with the wide viewing angle, but also make the display module 000 in the second display mode with the narrow viewing angle, by disposing the light-blocking part 20B1 with light-blocking effect, to block the light with the large viewing angle in the anti-peep mode, especially the light with the viewing angle greater than 45 degrees, thereby achieving desirable anti-peep effect.

It can be understood that in one embodiment, by controlling parameters such as overall stacking height and aspect ratio of the light-blocking part 20B1 included in the display anti-peep assembly 20B, the brightness under different large viewing angles in the anti-peep mode may be blocked, thereby achieving desirable anti-peep performance. In one embodiment, parameters such as the spacing distance and stacking height of the light-blocking part 20B1 may not be limited. In an implementation, specific designs may be made according to requirements of the anti-peep angle, which may not be described in detail in one embodiment.

It should be noted that specific design structures of the backlight assembly 10, the display assembly 20A and the display anti-peep assembly 20B may not be limited in one embodiment, and in an implementation, may refer to the structure of the anti-peep display module with the light-adjusting structure such as the liquid crystal cell in the existing technology.

In some optional embodiments, referring to FIGS. 1-3 and 5, FIG. 5 illustrates another cross-sectional structural schematic along the A-A' direction in FIG. 1. In one embodiment, the display assembly 20A and the display anti-peep assembly 20B may be independently disposed, and the display assembly 20A may be between the backlight assembly 10 and the display anti-peep assembly 20B; or the display anti-peep assembly 20B may be between the backlight assembly 10 and the display assembly 20A.

Figure 5:
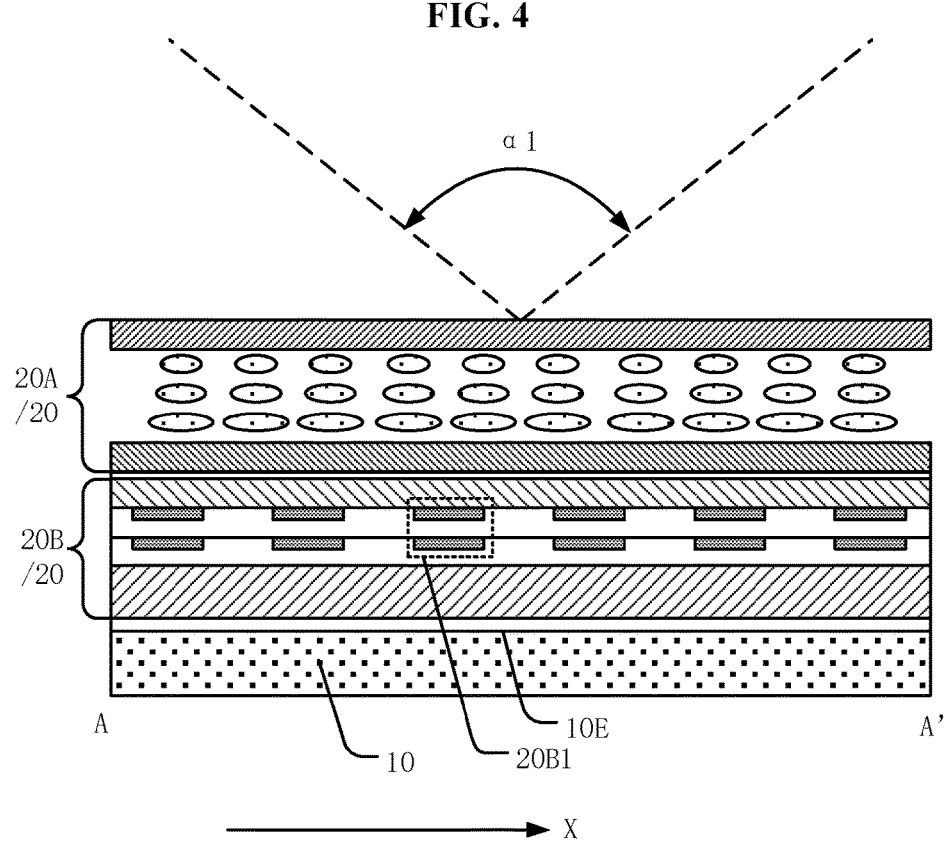
FIG. 5 illustrates another cross-sectional structural schematic along an A-A' direction in FIG. 1.

In one embodiment, it describes that in the display anti-peep assembly 20 on the light-exiting side 10E of the backlight assembly 10 disposed in the display module 000, the display assembly 20A and the display anti-peep assembly 20B may be two independent structures. That is, the display assembly 20A and the display anti-peep assembly 20B may be disposed independently and may be fixedly attached by an adhesive structure such as optical adhesive. Optionally, the display assembly 20A may be disposed between the backlight assembly 10 and the display anti-peep assembly 20B. That is, the display anti-peep assembly 20B may be on the side of the display assembly 20A away from the backlight assembly 10 (as shown in FIG. 2 and FIG. 3). The light exited from the light-exiting surface of the display assembly 20A may pass through the display anti-peep assembly 20B. When the display anti-peep assembly 20B is activated, the light exiting angle from the side of the display anti-peep assembly 20B away from the display assembly 20A may be relatively small, which is the first display mode with narrow viewing angle. When the display anti-peep assembly 20B is not activated, the light exiting angle from the side of the display anti-peep assembly 20B away from the display assembly 20A may be relatively large, which is the second display mode with a wide viewing angle. Optionally, the display anti-peep assembly 20B may also be disposed between the backlight assembly 10 and the display assembly 20A. That is, the display assembly 20A may be on the side of the display anti-peep assembly 20B away from the backlight assembly 10 (as shown in FIG. 5). The light exited from the light-exiting side 10E of the backlight assembly 10 may pass through the display anti-peep assembly 20B. When the display anti-peep assembly 20B is activated, the light exiting angle from the side of the display assembly 20A away from the backlight assembly 10 may be relatively small, which is the first display mode with the narrow viewing angle. When the display anti-peep assembly 20B is not activated, the light exiting angle from the side of the display assembly 20A away from the backlight assembly 10 may be relatively large, which is the second display mode with the wide viewing angle. In the display anti-peep assembly 20 of one embodiment, when being independently disposed, the positions for disposing the display assembly 20A and the display anti-peep assembly 20B may be selected and configured according to actual needs, which may be relatively flexible and only need to be on the light-exiting side 10E of the backlight assembly 10.

Figure 6:
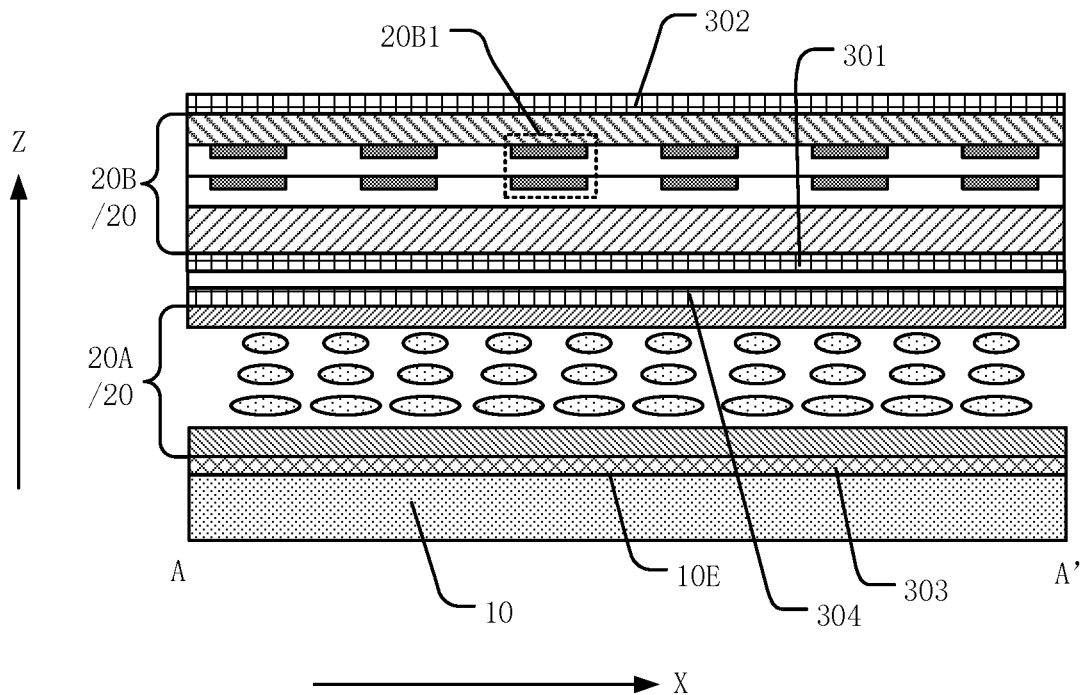
FIG. 6 illustrates another cross-sectional structural schematic along an A-A' direction in FIG. 1.
Figure 7:
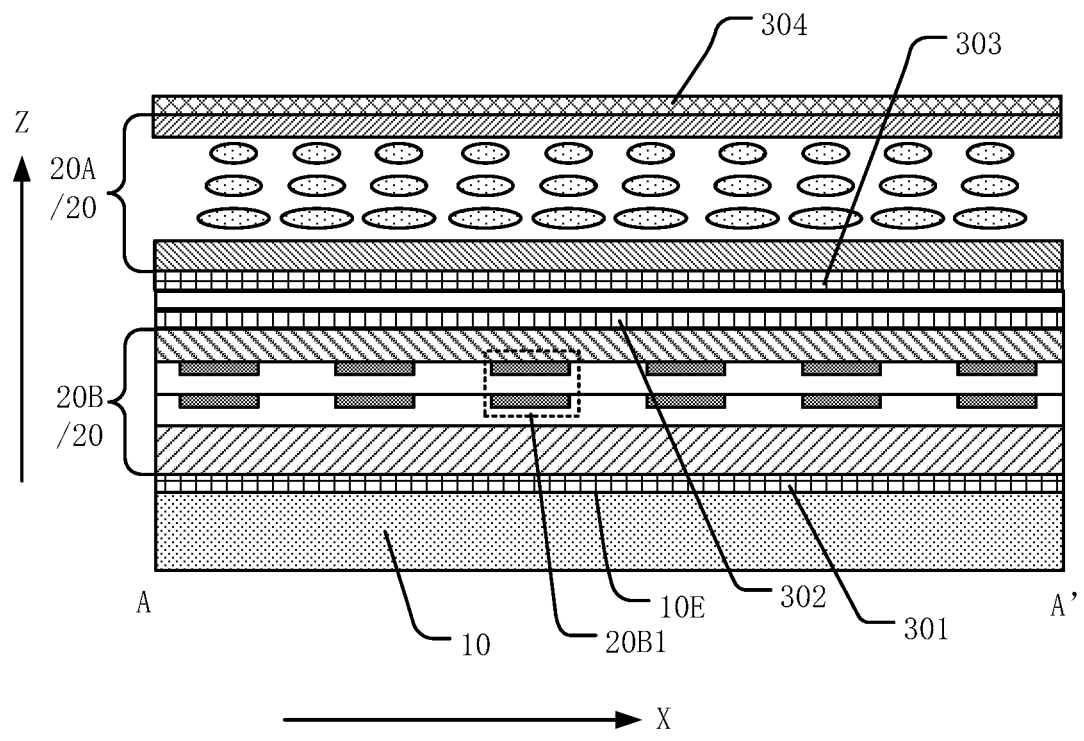
FIG. 7 illustrates another cross-sectional structural schematic along an A-A' direction in FIG. 1.

In some optional embodiments, referring to FIGS. 1, 6 and 7, FIG. 6 illustrates another cross-sectional structural schematic along the A-A' direction in FIG. 1; and FIG. 7 illustrates another cross-sectional structural schematic along the A-A' direction in FIG. 1. In one embodiment, the display module 000 may include the first polarizer 301 and the second polarizer 302; and along the direction Z perpendicular to the plane where the display module 000 is, the first polarizer 301 and the second polarizer 302 may be on two opposite sides of the display anti-peep assembly 20B, where the polarization direction of the first polarizer 301 and the polarization direction of the second polarizer 302 may be in parallel with each other.

The display module 000 may include the third polarizer 303 and the fourth polarizer 304; and along the direction Z perpendicular to the plane where the display module 000 is, the third polarizer 303 and the fourth polarizer 304 may be on two opposite sides of the display assembly 20A, where the polarization direction of the third polarizer 303 and the polarization direction of the fourth polarizer 304 may be perpendicular to each other. It can be understood that in FIGS. 6-7 of one embodiment, same filling patterns of the polarizers may indicate that the polarization directions may be in parallel with each other, and different filling patterns of the polarizers may indicate that the polarization directions may be perpendicular to each other. It can be understood that the polarization direction of the polarizer in one embodiment can be understood as the direction of the absorption axis of the polarizer and can also be understood as the direction of the transmission axis of the polarizer.

In one embodiment, it describes that the display module 000 may further include the first polarizer 301 and the second polarizer 302 on two opposite sides of the display anti-peep assembly 20B, and further include the third polarizer 303 and the fourth polarizer 304 on two opposite sides of the display assembly 20A. Optionally, as shown in FIG. 6, when the display assembly 20A is between the backlight assembly 10 and the display anti-peep assembly 20B, that is, when the display anti-peep assembly 20B is on the side of the display assembly 20A away from the backlight assembly 10, the first polarizer 301 may be on the side of the second polarizer 302 facing the display anti-peep assembly 20B, and the third polarizer 303 may be on the side of the fourth polarizer 304 facing the backlight assembly 10. Optionally, as shown in FIG. 7, when the display anti-peep assembly 20B is between the backlight assembly 10 and the display assembly 20A, that is, when the display assembly 20A is on the side of the display anti-peep assembly 20B away from the backlight assembly 10, the first polarizer 301 may be on the side of the second polarizer 302 facing the backlight assembly 10, and the third polarizer 303 may be on the side of the fourth polarizer 304 facing the display anti-peep assembly 20B.

When the display assembly 20A and the display anti-peep assembly 20B are disposed independently in one embodiment, the display assembly 20A may be a liquid crystal display panel, and the display anti-peep assembly 20B may be understood as the light-adjusting liquid crystal cell for adjusting the viewing angle. The polarization directions of the third polarizers 303 and the fourth polarizers 304 which are on two opposite sides of the display assembly 20A may be perpendicular to each other. The third polarizer 303 and the fourth polarizer 304 may be used as the lower polarizer and the upper polarizer of the liquid crystal display panel, respectively. The third polarizer 303 under the display assembly 20A may be used to convert the backlight light ray generated by the backlight assembly 10 into polarized light, and the fourth polarizer 304 above the display element 20A may be used to analyze the polarized light that is electrically modulated by the liquid crystal molecules of the display element 20A to generate a light-dark contrast, thereby generating the display picture. That is, the third polarizer 303 and the fourth polarizer 304 on two opposite sides of the display assembly 20A may pass and block the light path to control the amount of light transmitted; finally, the backlight light provided by the backlight assembly 10 may be refracted to generate the picture.

In addition, the polarization directions of the first polarizers 301 and the polarization directions of the second polarizers 302 on two opposite sides of the display anti-peep assembly 20B may be in parallel with each other. Therefore, after the polarized light passes through the first polarizer 301, the display anti-peep assembly 20B and the second polarizer 302, in the first display mode with the narrow viewing angle, the display anti-peep assembly 20B may enable a reduced viewing angle. The polarization direction of the first polarizer 301 and the polarization direction of the second polarizer 302 are in parallel with each other, so that when the light passes through the first polarizer 301, the display anti-peep assembly 20B and the second polarizer 302, only the angle of the viewing angle of the light may be changed, and the light-transmitting amount of the light may not be changed, which may ensure the light transmittance of the display anti-peep assembly 20B, thereby avoiding the loss of light-transmitting amount of the display module 000. Optionally, as shown in FIG. 6, the polarization direction of the fourth polarizer 304 and the polarization direction of the first polarizer 301 are in parallel with each other, so that the light exited from the display assembly 20A may still be transmitted after being analyzed by the fourth polarizer 304 and then entering the first polarizer 301. Optionally, as shown in FIG. 7, the polarization direction of the second polarizer 302 and the polarization direction of the third polarizer 303 are in parallel with each other, so that the light exited from the display anti-peep assembly 20B may still be transmitted after passing through the second polarizer 302 and then entering the third polarizer 303. In the second display mode of the wide viewing angle, the display anti-peep assembly 20B may not be activated. The polarization direction of the first polarizer 301 and the polarization direction of the second polarizer 302 are in parallel with each other, so that when the light passes through the first polarizer 301, the display anti-peep assembly 20B and the second polarizer 302, the light-transmitting amount and the viewing angle of the exiting light may not change, which may ensure both light transmittance and present the wide viewing angle.

Figure 8:
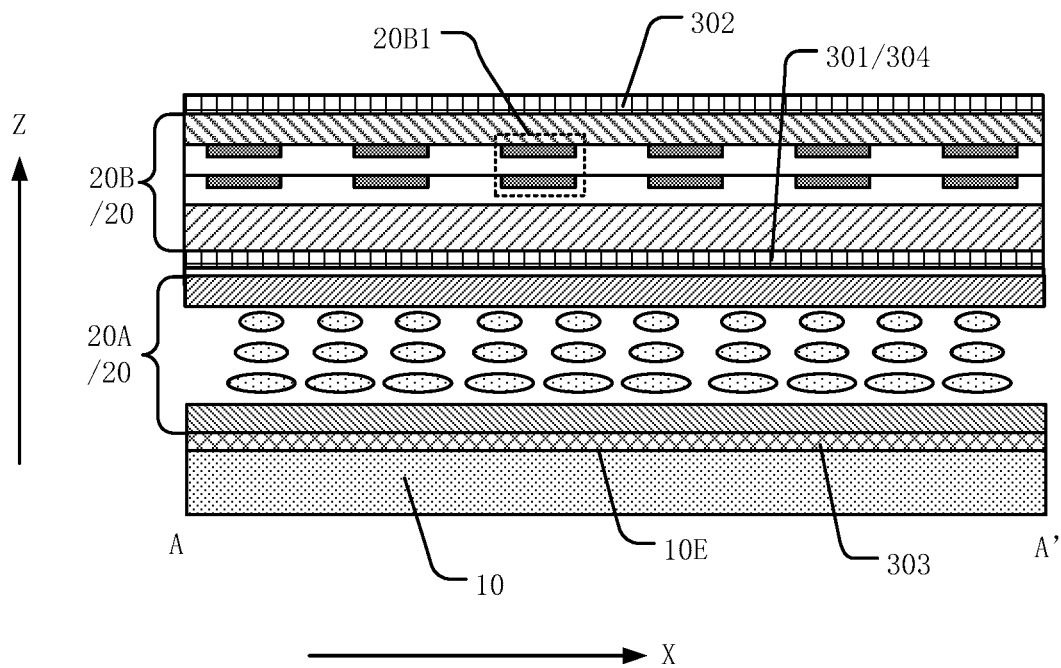
FIG. 8 illustrates another cross-sectional structural schematic along an A-A' direction in FIG. 1.
Figure 9:
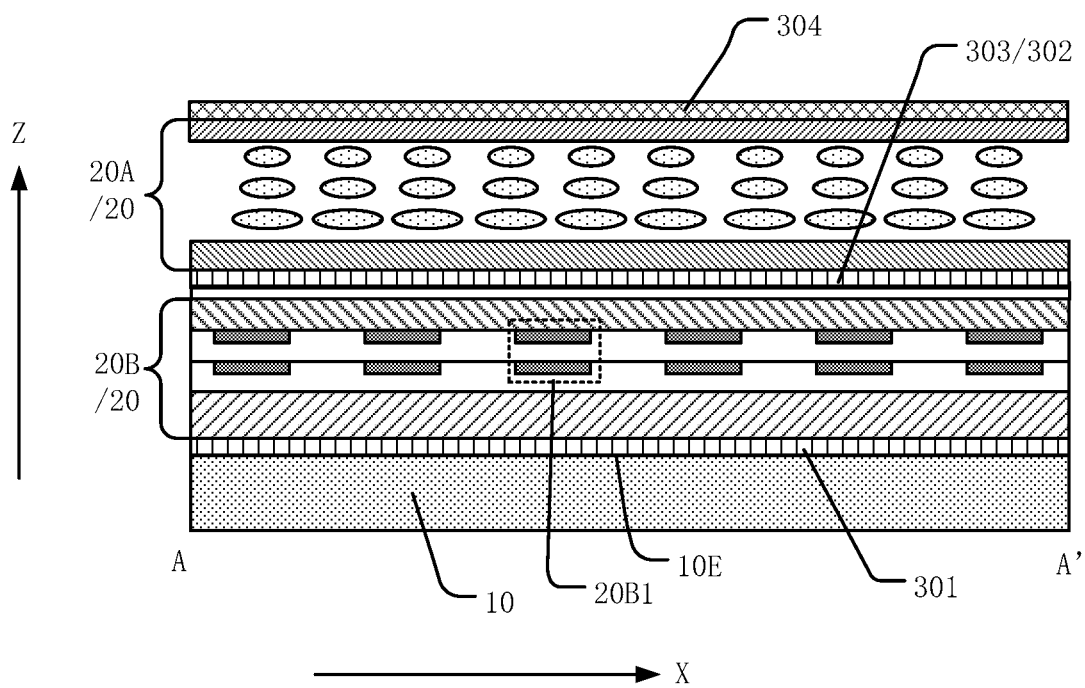
FIG. 9 illustrates another cross-sectional structural schematic along an A-A' direction in FIG. 1.

Optionally, referring to FIGS. 1, 8 and 9, FIG. 8 illustrates another cross-sectional structural schematic along the A-A' direction in FIG. 1; and FIG. 9 illustrates another cross-sectional structural schematic along the A-A' direction in FIG. 1. As shown in FIG. 8, when the display assembly 20A is between the backlight assembly 10 and the display anti-peep assembly 20B, that is, when the display anti-peep assembly 20B is on the side of the display assembly 20A away from the backlight assembly 10, the first polarizer 301 may be on the side of the second polarizer 302 facing the display anti-peep assembly 20B, the third polarizer 303 may be on the side of the fourth polarizer 304 facing the backlight assembly 10, and the polarization directions of two adjacent polarizers including the fourth polarizer 304 and the first polarizers 301 may be in parallel with each other. At this point, the fourth polarizer 304 and the first polarizer 301 may share one polarizer, which may reduce overall thickness of the display module 000. Optionally, as shown in FIG. 9, when the display anti-peep assembly 20B is between the backlight assembly 10 and the display assembly 20A, that is, when the display assembly 20A is on the side of the display anti-peep assembly 20B away from the backlight assembly 10, the first polarizer 301 may be on the side of the second polarizer 302 facing the backlight assembly 10, the third polarizer 303 may be on the side of the fourth polarizer 304 facing the display anti-peep assembly 20B, and the polarization directions of two adjacent polarizers including the second polarizer 302 and the third polarizers 303 may be in parallel with each other. At this point, the second polarizer 302 and the third polarizer 303 may share one polarizer, which may reduce overall thickness of the display module 000.

Figure 10:
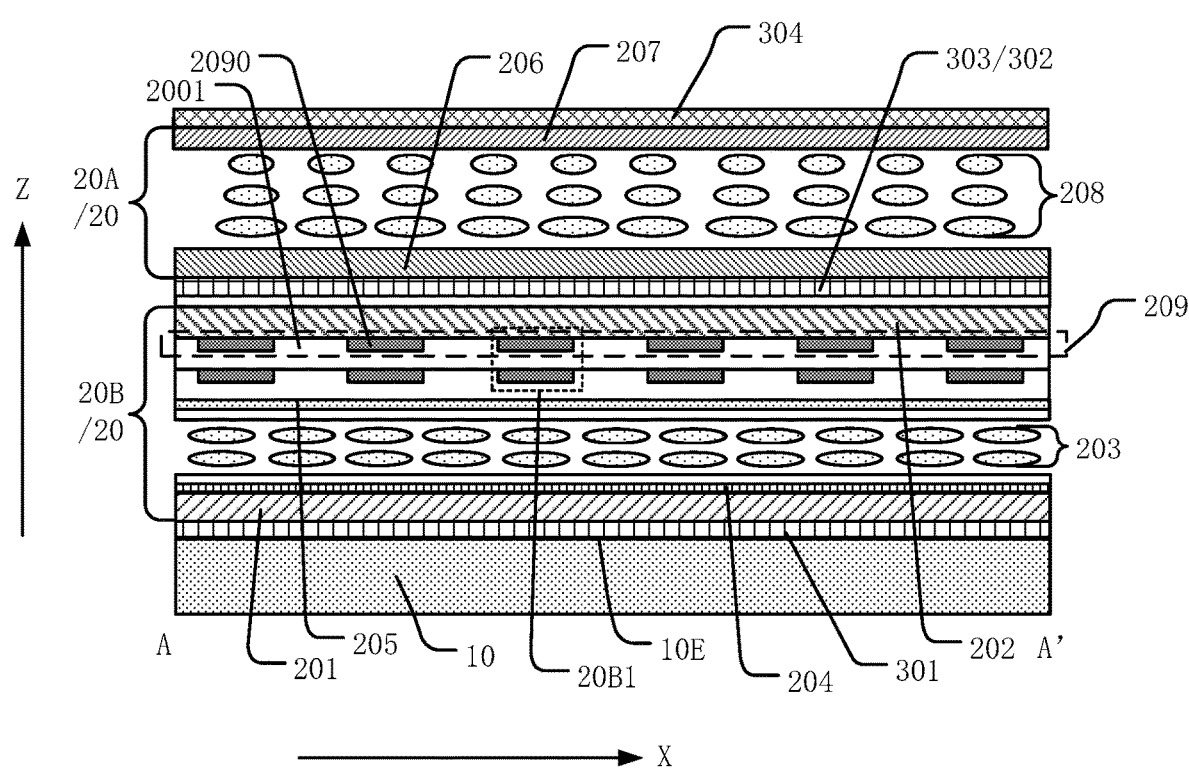
FIG. 10 illustrates another cross-sectional structural schematic along an A-A' direction in FIG. 1.
Figure 11:
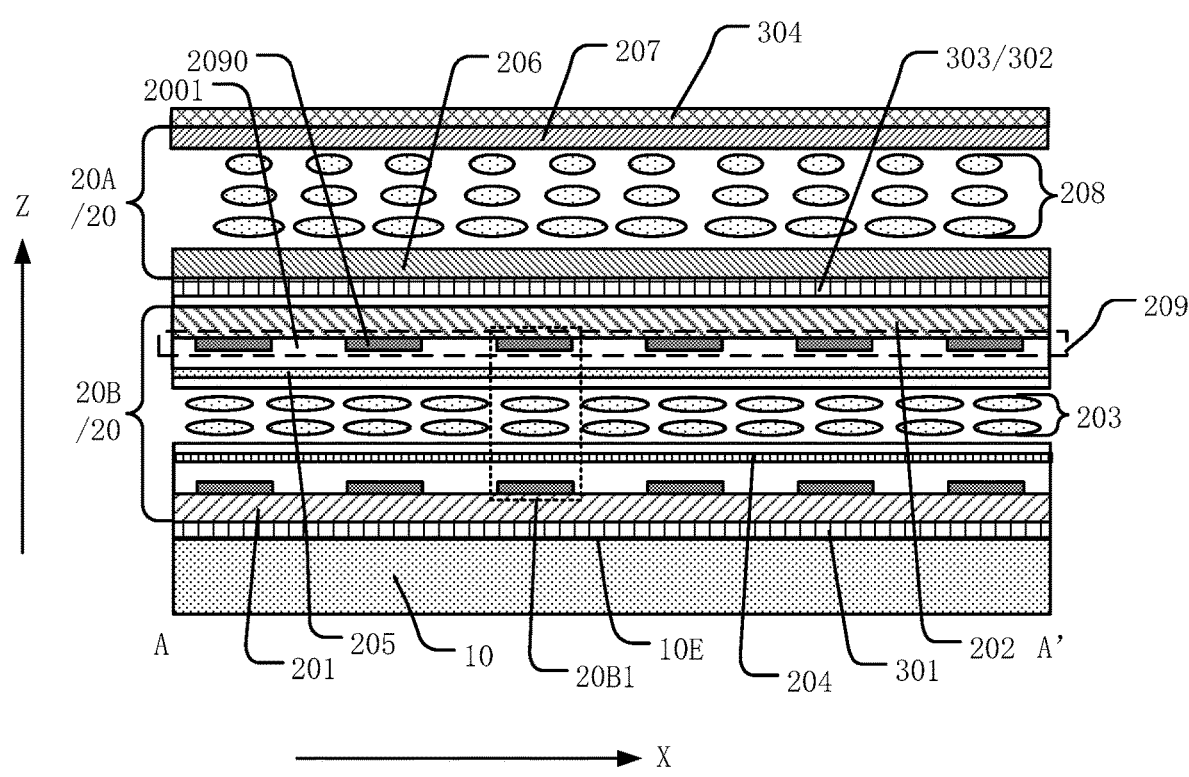
FIG. 11 illustrates another cross-sectional structural schematic along an A-A' direction in FIG. 1.
Figure 12:
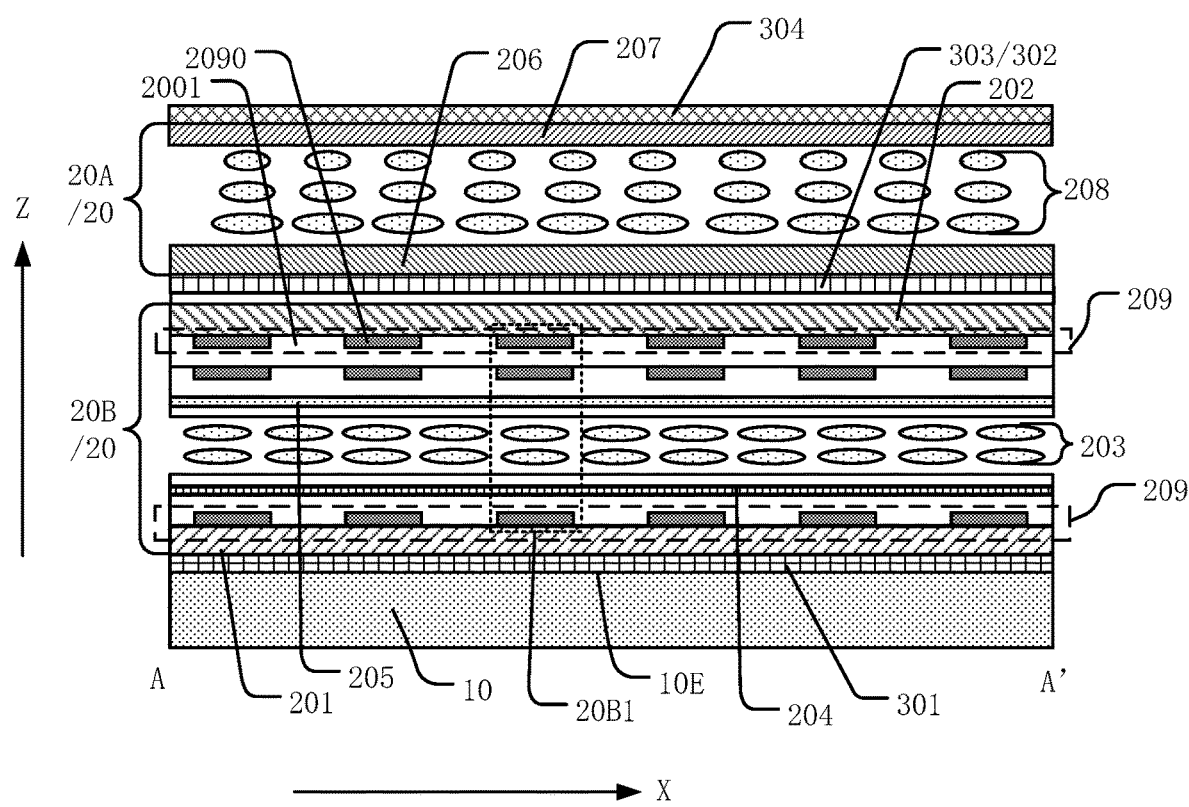
FIG. 12 illustrates another cross-sectional structural schematic along an A-A' direction in FIG. 1.
Figure 13:
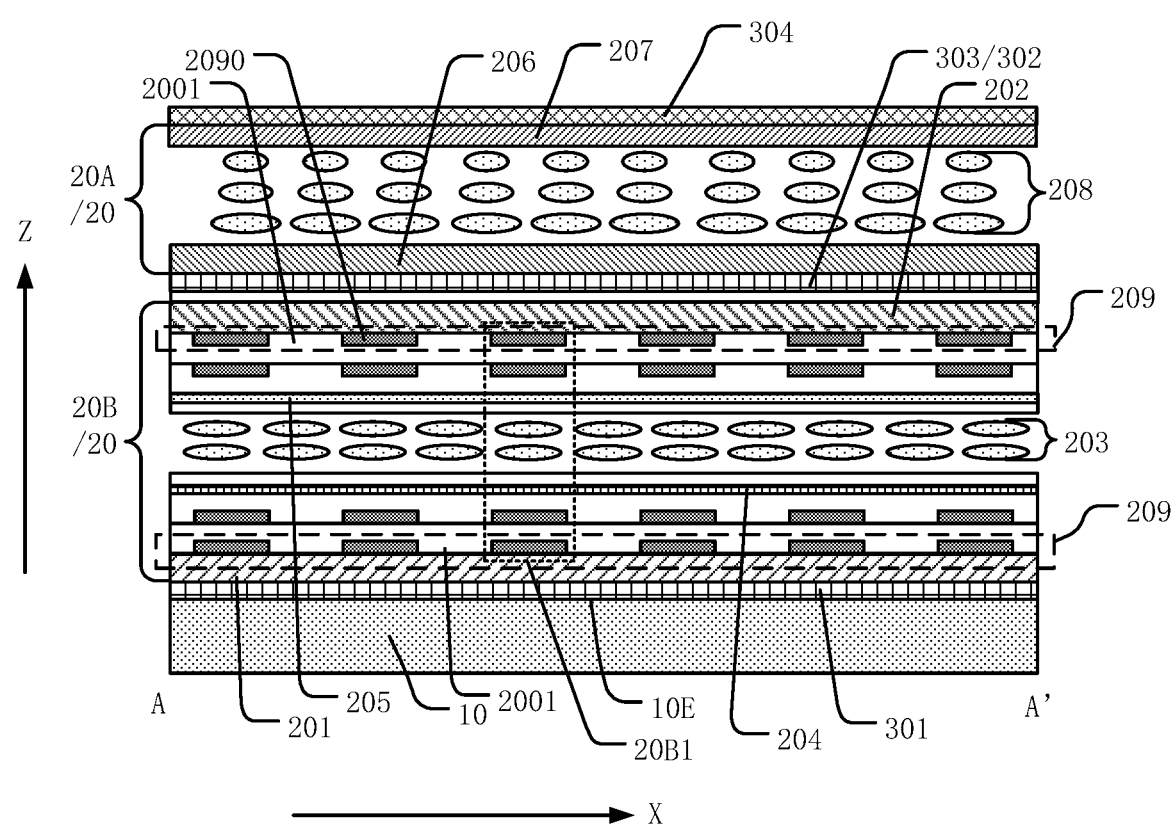
FIG. 13 illustrates another cross-sectional structural schematic along an A-A' direction in FIG. 1.

In some optional embodiments, referring to FIGS. 1 and 10, FIG. 10 illustrates another cross-sectional structural schematic along the A-A' direction in FIG. 1. In one embodiment, the display anti-peep assembly 20B may further include the first substrate 201, the second substrate 202, and the first liquid crystal layer 203 between the first substrate 201 and the second substrate 202; and the first substrate 201 may be on the side of the second substrate 202 facing the backlight assembly 10. Optionally, in one embodiment, the display anti-peep assembly 20B may be between the backlight assembly 10 and the display assembly 20A, that is, the display assembly 20A may be on the side of the display anti-peep assembly 20B away from the backlight assembly 10, as an example to describe the structure of the display anti-peep assembly 20B. During an implementation, the display anti-peep assembly 20B of such structure may also be on the side of the display assembly 10A away from the backlight assembly 10, which may not be shown in drawings in one embodiment.

The side of the first substrate 201 facing the first liquid crystal layer 203 may include the first electrode layer 204, and the side of the second substrate 202 facing the first liquid crystal layer 203 may include the second electrode layer 205.

In one embodiment, it describes that when the display assembly 20A and the display anti-peep assembly 20B of the display anti-peep assembly 20 are independently disposed, the display assembly 20A may be a liquid crystal display panel, and the display anti-peep assembly 20B may be a light-adjusting liquid crystal cell including a plurality of light-blocking parts 20B1. For example, in addition to the plurality of light-blocking parts 20B1, the display anti-peep assembly 20B may further include the first substrate 201, the second substrate 202, and the first liquid crystal layer 203 between the first substrate 201 and the second substrate 202. The first substrate 201 may be on the side of the second substrate 202 facing the backlight assembly 10. That is, the first substrate 201 may be understood as the lower substrate of the display anti-peep assembly 20B, and the second substrate 202 may be understood as the upper substrate of the display anti-peep assembly 20B. The first substrate 201 and the second substrate 202 may both be glass substrates and may also be rigid substrates made of other materials.

In one embodiment, the first electrode layer 204 may be disposed on the side of the first substrate 201 facing the first liquid crystal layer 203, the second electrode layer 205 may be disposed on the side of the second substrate 202 facing the first liquid crystal layer 203, and the second electrode layer 205 may cooperate with the first electrode layer 204 to form an electric field that drives the deflection of liquid crystal molecules of the first liquid crystal layer 203 between the first substrate 201 and the second substrate 202. Optionally, the first electrode layer 204 and the second electrode layer 205 in one embodiment may both have an entire-surface structure; and an electric field that drives the deflection of the liquid crystal molecules of the first liquid crystal layer 203 may be formed between the first substrate 201 and the second substrate 201 through the first electrode layer 204 and the second electrode layer 205, which may realize the anti-peep effect of the display anti-peep assembly 20B through different deflection angles of the liquid crystal. In one embodiment, switching between the wide viewing angle mode and the narrow viewing angle mode may be realized by the difference of the drive electric fields formed by the second electrode layer 205 and the first electrode layer 204. In one embodiment, the technology for realizing the viewing angle switching of the display anti-peep assembly 20B of the light-adjusting liquid crystal cell structure may not be described in detail and may refer to the principle of the liquid crystal light-adjusting cell in the existing technology.

Optionally, the display assembly 20A in one embodiment may be a liquid crystal display panel; the display assembly 20A may include the third substrate 206, the fourth substrate 207, and the second liquid crystal layer between the third substrate 206 and the fourth substrate 207 208; the third substrate 206 can be understood as the base substrate of an array substrate; and the fourth substrate 207 can be understood as the base substrate of a color filter substrate. It can be understood that specific film structure of the display assembly 20A may not be described in detail in one embodiment. The display assembly 20A may further include scan lines, data lines, pixel electrodes, common electrodes and the like on the third substrate 206, and may also include color resist structures, black matrix structures and the like on the fourth substrate 207, which may not be described in detail herein and may be understood by referring to the structure of the liquid crystal display panel in the existing technology.

Optionally, the first substrate 201, the second substrate 202, the third substrate 206, and the fourth substrate 207 in one embodiment may be made of materials such as glass, acrylic, and polycarbonate. The materials of the first electrode layer 204, the second electrode layer 205, the common electrode and the pixel electrode may be indium tin oxide (ITO) or indium zinc oxide (IZO) and the like, which may not be described in detail in one embodiment.

In some optional embodiments, referring to FIGS. 1-10, in one embodiment, the display anti-peep assembly 20B may include at least two light-blocking layers 209.

Along the direction Z perpendicular to the plane of the first substrate 201, the first transparent insulating layer 2001 may be included between two light-blocking layers 209; each light-blocking layer 209 may include a plurality of first light-blocking sub-parts 2090; and the plurality of first light-blocking sub-parts 2090 may be arranged along the direction in parallel with the plane of the first substrate 201 (the direction X as shown in drawings).

Along the direction Z perpendicular to the plane of the first substrate 201, at least two first light-blocking sub-parts 2090 may be overlapped with each other, and a plurality of overlapped first light-blocking sub-parts 2090 may form one light-blocking part 20B1.

In one embodiment, it describes that the light-blocking part 20B1 included in the display anti-peep assembly 20B may be provided with the light-blocking layer 209 in the display anti-peep assembly 20B and include at least two light-blocking layers 209 which are stacked and disposed. Two light-blocking layers 209 may be separated by the first transparent insulating layer 2001. Each light-blocking layer 209 may include a plurality of first light-blocking sub-parts 2090 arranged along the direction in parallel with the plane of the first substrate 201 (the direction X as shown in figures). All first light-blocking sub-parts 2090 at a same position of each light-blocking layer 209 may be overlapped with each other along the direction Z perpendicular to the plane of the first substrate 201 to form the light-blocking part 20B1 of the display anti-peep assembly 20B. Through the light-blocking function of the light-blocking part 20B1 formed by the overlapped arrangement of at least two first light-blocking sub-parts 2090, the large viewing angle light in the anti-peep mode, especially the light with the viewing angle greater than or equal to 45 degrees, may be blocked, which may reduce the brightness of the display picture under the large viewing angle and be beneficial for ensuring the anti-peep effect in the anti-peep mode. In one embodiment, free switching between the first display mode with the narrow viewing angle and the second display mode with the wide viewing angle may be realized through the light-adjusting liquid crystal cell formed by the first electrode layer 204, the second electrode layer 205 and the first liquid crystal layer 203 of the display anti-peep assembly 20B; in addition, the display module 000 may block the light with the large viewing angle in the anti-peep mode, especially the light with the viewing angle greater than 45 degrees in the second display mode with the narrow viewing angle, though the light-blocking effect of the light-blocking part 20B1 formed by the overlapped arrangement of at least two first light-blocking sub-parts 2090, thereby realizing desirable anti-peep protection effect.

Optionally, as shown in FIGS. 1-10, the quantity of the light-blocking layers 209 may be 2-4, and the side of the second substrate 202 facing the first substrate 201 may include at least one light-blocking layer 209. That is, at least two light-blocking layers 209 for forming the light-blocking part 20B1 in one embodiment may include 2-4 light-blocking layers, and the side of the second substrate 202 facing the first substrate 201 may include at least one light-blocking layer 209. As shown in FIG. 10, the quantity of light-blocking layers 209 may be two, and two light-blocking layers 209 may be both located on the side of the second substrate 202 facing the first substrate 201.

Optionally, referring to FIGS. 1-11, FIG. 11 illustrates another cross-sectional structural schematic along the A-A' direction in FIG. 1. The quantity of the light-blocking layers 209 may be two, where one light-blocking layer may be on the side of the first substrate 201 facing the second substrate 202, and the other light-blocking layer 209 may be on the side of the second substrate 202 facing the first substrate 201.

Optionally, referring to FIGS. 1-12, FIG. 12 illustrates another cross-sectional structural schematic along the A-A' direction in FIG. 1. The quantity of the light-blocking layers 309 may be three, where two light-blocking layers 209 may be on the side of the second substrate 202 facing the first substrate 201, and one light-blocking layer 209 may be on the side of the first substrate 201 facing the second substrate 202.

Optionally, referring to FIGS. 1-13, FIG. 13 illustrates another cross-sectional structural schematic along the A-A' direction in FIG. 1. The quantity of the light-blocking layers 209 may be four, where two light-blocking layers 209 may be on the side of the second substrate 202 facing the first substrate 201; and the other two light-blocking layers 209 may be on the side of the first substrate 201 facing the second substrate 202.

In one embodiment, the quantity of the light-blocking layers 209 forming the light-blocking part 20B1 may not be limited, which may need to satisfy that the first light-blocking sub-parts 2090 in each light-blocking layer 209 may be overlapped with each other along the direction Z perpendicular to the plane of the first substrate 201, the plurality of overlapped first light-blocking sub-parts 2090 may form one light-blocking part 20B1, and the light-blocking part 20B1 formed by the overlapped of the first light-blocking sub-parts 2090 may block the light with the large viewing angle in the anti-peep mode, especially the light with the viewing angle greater than 45 degrees.

Figure 14:
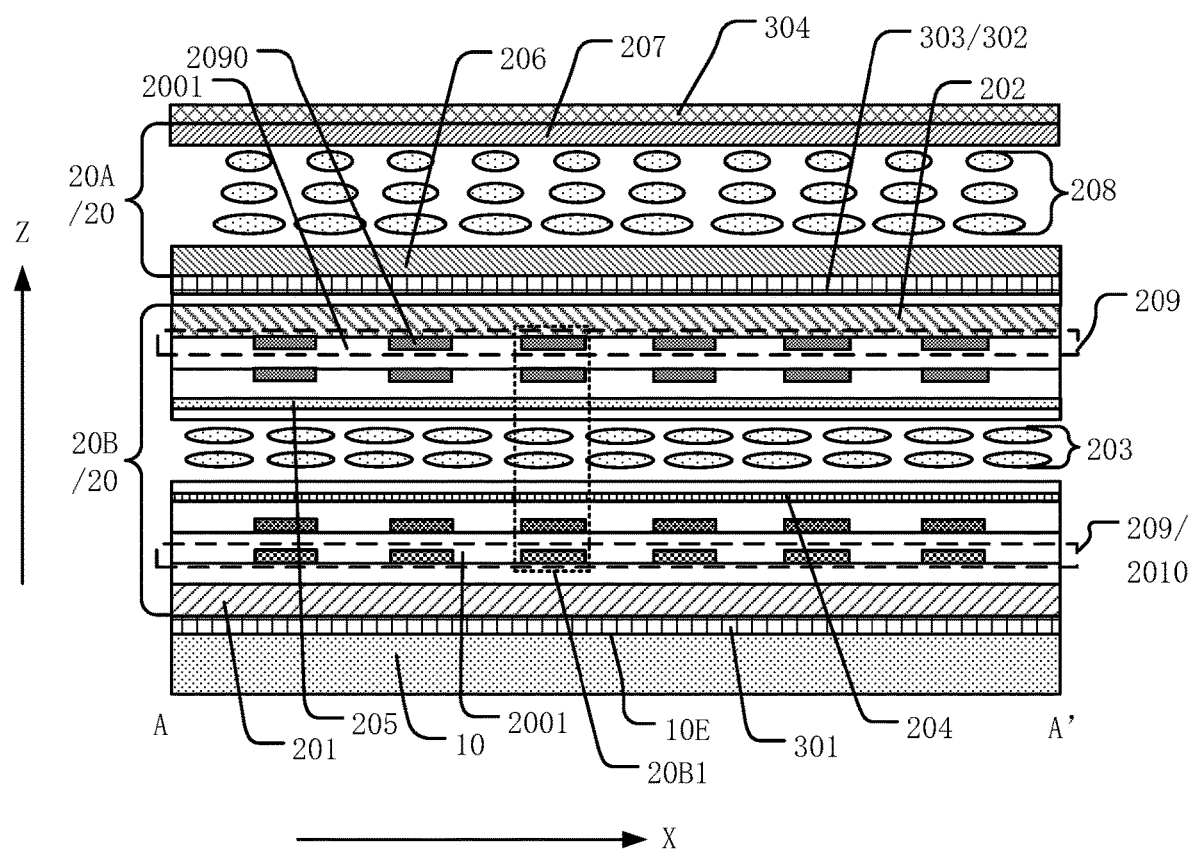
FIG. 14 illustrates another cross-sectional structural schematic along an A-A' direction in FIG. 1.

In some optional embodiments, referring to FIGS. 1 and 14, FIG. 14 illustrates another cross-sectional structural schematic along the A-A' direction in FIG. 1. In one embodiment, the side of the first substrate 201 facing the second substrate 202 may include a plurality of metal layers 2010; and the light-blocking layer 209 may reuse the metal layer 2010.

In one embodiment, it describes that the display anti-peep assembly 20B used as the liquid crystal light-adjusting cell may include metal conductive layers. For example, the side of the first substrate 201 facing the second substrate 202 may include the plurality of metal layers 2010. The plurality of metal layers 2010 may be used to fabricate structures such as signal lines and the like. The signal lines may be configured for electrical connection with the first electrode layer 204 to provide drive signals for the first electrode layer 204, which may realize the deflection of liquid crystal molecules in the first liquid crystal layer 203 of the display anti-peep assembly 20B. It can be understood that the first electrode layer 204 and the second electrode layer 205 in one embodiment may both be planar entire-surface electrodes. In some other optional embodiments, one of the first electrode layer 204 and the second electrode layer 205 may be a bulk electrode with sub-regions and controlled by a thin film transistor disposed in the metal layer, which may realize regional controllability of switching between wide and narrow viewing angles of the display anti-peep assembly 20B. For example, the plurality of metal layers 2010 may include at least the first metal layer and the second metal layer. The first metal layer may be configured to fabricate the gate electrode of the thin film transistor, and the second metal layer may be configured to fabricate the source electrode and the drain electrode of the thin film transistor (not shown in drawings). The metal layer 2010 not only has the function of conducting electricity, but also has the property of being not light-transmitting. Therefore, in one embodiment, at least one light-blocking layer 209 on the side of the first substrate 201 facing the second substrate 202 may reuse the metal layer 2010 on the side of the first substrate 201 facing the second substrate 202, that is, reuse the metal layer 2010 to form the first light-blocking sub-part 2090, so that the first light-blocking sub-parts 2090 fabricated by the metal layer 2010 may be overlapped to form the light-blocking part 20B1. Furthermore, the first light-blocking sub-part 2090 may be fabricated by using the film layer included in the display anti-peep assembly 20B, which may be beneficial for further reducing the thickness of the display anti-peep assembly 20B and realizing the thin design of the display module 000.

Figure 15:
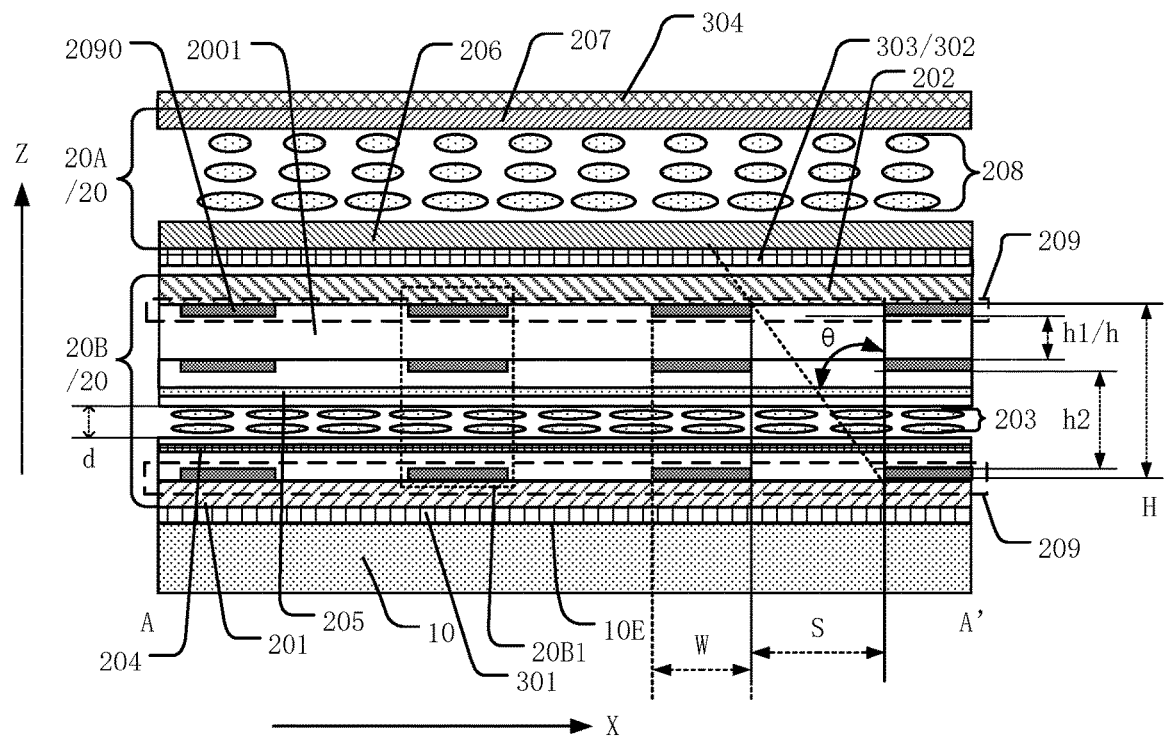
FIG. 15 illustrates another cross-sectional structural schematic along an A-A' direction in FIG. 1.

In some optional embodiments, referring to FIG. 1 and FIG. 15, FIG. 15 illustrates another cross-sectional structural schematic along the A-A' direction in FIG. 1. In one embodiment, along the first direction X, the width of the light-blocking part 20B1 is W, and the plurality of light-blocking parts 20B1 may be arranged along the first direction X.

Along the direction Z perpendicular to the plane of the first substrate 201, the distance between two adjacent overlapped first light-blocking sub-parts 2090 is h, where the range of W:h may be 0.7:1-1.3:1.

In one embodiment, it describes that in the light-blocking part 20B1 formed by at least two overlapped first light-blocking sub-parts 2090, the arrangement of the plurality of light-blocking parts 20B1 may be in a square shape. As shown along the first direction X of FIG. 12, the width of the light-blocking part 20B1 is W. Optionally, the light-blocking part 20B1 may be a strip-shaped structure, and the length extending direction of the light-blocking part 20B1 of the strip-shaped structure may intersect the first direction X. Along the direction Z perpendicular to the plane of the first substrate 201, the distance between two adjacent first light-blocking sub-parts 2090 that are overlapped to form one light-blocking part 20B1 is h. In one embodiment, the minimum value of W:h may be configured to 0.7:1, and the maximum value of W:h may be configured to 1.3:1. That is, the range of W:h may be 0.7:1-1.3:1. Optionally, the width W of the light-blocking part 20B1 along the first direction X may be configured to be equal to the distance h between two adjacent overlapped first light-blocking sub-parts 2090 along the direction Z perpendicular to the plane of the first substrate 201. Furthermore, optionally, the width W of the light-blocking part 20B1 along the first direction X may be 3-7 In such way, it may avoid the distance h between the first light-blocking sub-parts 2090 of different layers is excessively large to cause light leakage when the width W of a single first light-blocking sub-part 2090 is relatively small; and also avoid that the distance h between the first light-blocking sub-parts 2090 of different layers is excessively small to cause overall thickness of overlapped light-blocking parts 20B1 to be excessively small, which may result in less blocking of the light with the large viewing angle in the anti-peep mode, especially the light with the viewing angle greater than 45 degrees. Therefore, in one embodiment, the range of W:h may be configured to be 0.7:1-1.3:1, which may ensure that the light-blocking part 20B1 formed by overlapped first light-blocking sub-parts 2090 has desirable effect of blocking light leakage from the large viewing angle.

Optionally, in one embodiment, when the light-blocking layer 209 includes at least three sub-parts, that is, when the light-blocking part 20B1 is formed by at least three overlapped first light-blocking sub-parts 2090, along the direction Z perpendicular to the plane of the first substrate 201, the distance between two adjacent overlapped first light-blocking sub-parts 2090 is h1, and the distance between other two adjacent overlapped first light-blocking sub-parts 2090 is h2, where h1=h2, which may be beneficial for desirably ensuring that the light-blocking part 20B1 formed by overlapped first light-blocking sub-parts 2090 has desirable blocking effect on light leakage at the viewing angle greater than or equal to 45 degrees.

In some optional embodiments, referring to FIGS. 1-15, the plurality of light-blocking parts 20B1 may be arranged along the first direction X; and along the first direction X, the distance between two adjacent light-blocking parts 20B1 is S.

Along the direction Z perpendicular to the plane of the first substrate 201, the height of the light-blocking part 20B1 formed by the plurality of overlapped first light-blocking sub-parts 2090 is H, and S/H=1.

In one embodiment, it describes the gaps between two adjacent first light-blocking sub-parts 2090 of a same light-blocking layer 209, that is, the plurality of light-blocking parts 20B1 may be arranged along the first direction X, the distance between two adjacent light-blocking parts 20B1 along the first direction X is S, the height of entire light-blocking part 20B1 along the direction Z perpendicular to the plane of the first substrate 201 is H, the S:H ratio may be close to 1:1, and optional range of the angle θ in FIG. 15 may be about 45±15°. Therefore, the light-blocking part 20B1 formed by overlapped first light-blocking sub-parts 2090 may block leaked light with the large viewing angle (such as 45 degrees-90 degrees). That is, the light may only be exited from the angles within 45 degrees and remaining leaked light with the large viewing angle may be blocked by the light-blocking part 20B1 disposed in the display anti-peep assembly, which may ensure that the light-blocking part 20B1 formed by overlapped first light-blocking sub-parts 2090 has desirable effect of blocking light leakage from the large viewing angle.

In some optional embodiments, referring to FIGS. 1-15, the first liquid crystal layer 203 may include liquid crystal molecules; the refractive index of the liquid crystal molecules for ordinary polarized light is n1; and the refractive index of liquid crystal molecules for extraordinary polarized light is n2, where $\Delta n = n2 - n1$.

Along the direction Z perpendicular to the plane of the first substrate 201, the height of the first liquid crystal layer 203 is d, and the range of $\Delta n \times d$ may be 400-1200 nm.

In one embodiment, it describes that for the structure of the display anti-peep assembly 20B, when the display anti-peep assembly 20B is the liquid crystal light-adjusting cell, the first liquid crystal layer 203 may include multiple liquid crystal molecules, and the phase retardation value of the first liquid crystal layer 203 may be determined by Δn×d, where Δn=n2-n1, n1 is the refractive index of liquid crystal molecules for ordinary polarized light, and n2 is the refractive index of liquid crystal molecules for extraordinary polarized light. The liquid crystal material itself may have the characteristic of birefringence, that is, the refractive indices along the long axis direction of the liquid crystal molecules and the short axis direction of the liquid crystal molecules may be different from each other. The property of birefringence refers to the phenomenon that one incident ray may generate two refracted rays. After the incident light enters the liquid crystal molecules with anisotropy, the light may be decomposed into two polarized lights whose vibration directions are perpendicular to each other and have different propagation speeds. A light beam that satisfies the law of refraction is called ordinary polarized light, and a light beam that does not satisfy the law of refraction is called extraordinary polarized-light. In one embodiment, the range of Δn×d of the display anti-peep assembly 20B may be configured to be 400-1200 nm. Optionally, the range of Δn×d may be 600-1200 nm or the range of Δn×d may be 800-1200 nm. Optionally, the range of Δn×d may be 600-1000 nm. d is the height of the first liquid crystal layer 203 along the direction Z perpendicular to the plane of the first substrate 201, that is, the thickness of the liquid crystal cell of the display anti-peep assembly 20B. In one embodiment, by configuring Δn×d to in a suitable range of 400-1200 nm, desirable anti-peep effect may be achieved within the viewing angles in the range of 45-60°.

In some optional embodiments, referring to FIGS. 1-FIG. 16, FIG. 16 illustrates another cross-sectional structural schematic along the A-A' direction in FIG. 1. In one embodiment, the plurality of light-blocking parts 20B1 may be disposed between the first electrode layer 204 and the second electrode layer 205; the side of the light-blocking part 20B1 facing the second substrate 202 may be in contact with the second electrode layer 205; and the side of at least of a part of the light-blocking parts 20B1 facing the first substrate 201 may be in contact with the first electrode layer 204.

In one embodiment, it describes that the light-blocking part 20B1 included in the display anti-peep assembly 20B may be disposed between the first electrode layer 204 and the second electrode layer 205 in the display anti-peep assembly 20B; and the first electrode layer 204, the second electrode layer 205 and the first liquid crystal layer 203 of the display anti-peep assembly 20B may form the light-adjusting liquid crystal cell. Since the liquid crystal molecules in the first liquid crystal layer 203 are deflected by forming an electric field between the first electrode layer 204 and the second electrode layer 205, free switching between the first display mode with the narrow viewing angle and the second display mode with the wide viewing angle may be further realized. The plurality of light-blocking parts 20B1 may be disposed between the first electrode layer 204 and the second electrode layer 205. Optionally, the side of the light-blocking part 20B1 facing the second substrate 202 may be in contact with the second electrode layer 205; and the side of at least a part of the light-blocking parts 20B1 facing the first substrate 201 may be in contact with the first electrode layer 204. That is, the light-blocking part 20B1 may be disposed between the liquid crystal molecules of the first liquid crystal layer 203, the top of the light-blocking part 20B1, that is, the side facing the second substrate 202, may be in direct contact with the second electrode layer 205, and the bottom at least a part of the light-blocking parts 20B1, that is, the side facing the first substrate 201, may be in contact with the first electrode layer 204. The light-blocking part 20B1 may have light-blocking effect to block the light with the large viewing angle in the anti-peep mode, especially the light with the viewing angle greater than or equal to 45 degrees, to reduce the brightness of the display picture when viewing the display at the large viewing angle, which may be beneficial for ensuring the anti-peep effect in the anti-peep mode and also be used for support between the first substrate 201 and the second substrate 202.

Figure 16:
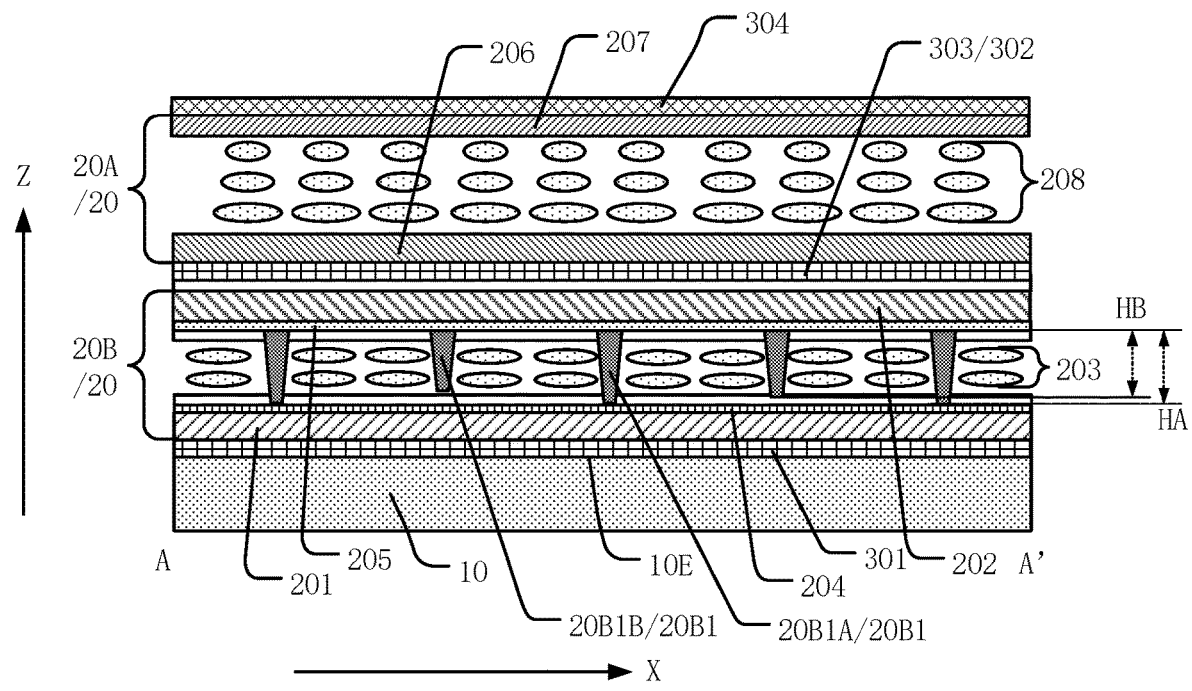
FIG. 16 illustrates another cross-sectional structural schematic along an A-A' direction in FIG. 1.
Figure 17:
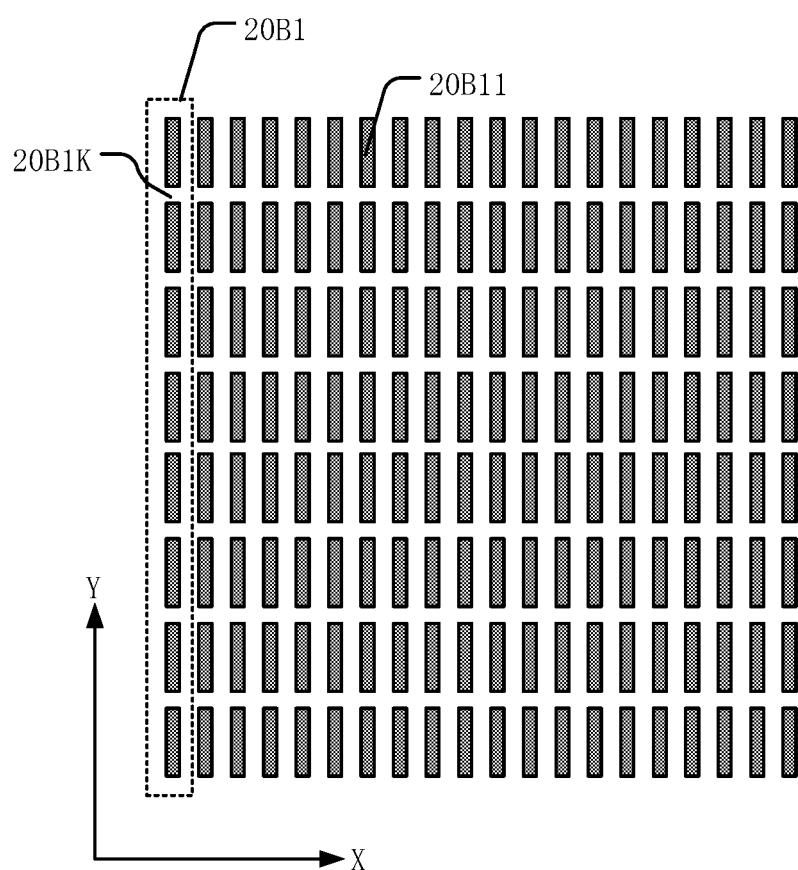
FIG. 17 illustrates a planar structural schematic of a plurality of light-blocking parts in FIG. 16.

Optionally, referring to FIGS. 16-17, FIG. 17 illustrates a planar structural schematic of the plurality of light-blocking parts in FIG. 16. The plurality of light-blocking parts 20B1 may be arranged along the first direction X; along the second direction Y, one light-blocking part 20B1 may include a plurality of second light-blocking sub-parts 20B11; and gaps 20B1K may be between the plurality of second light-blocking sub-parts 20B11. The first direction X may intersect the second direction Y along the direction in parallel with the plane of the display module 000. In one embodiment, the first direction X and the second direction Y may be perpendicular to each other along the direction in parallel with the plane of the display module 000, which is taken as an example for illustration.

In one embodiment, the plurality of light-blocking parts 20B1 may be arranged along the first direction X, one light-blocking part 20B1 may include the plurality of second light-blocking sub-parts 20B11 in the extending direction of its length, that is, the second direction Y in FIG. 17, and gaps 20B1K may be between two adjacent second light-blocking sub-parts 20B11 along the second direction Y. In such way, while the light-blocking part 20B1 may block light leakage with the large viewing angle and support the light-adjusting liquid crystal cell formed by the first substrate 201 and the second substrate 202, the light-blocking part 20B1 may also ensure that the fluidity of the liquid crystal in the first liquid crystal layer 203 is not restricted.

In some optional embodiments, referring to FIGS. 1-16, the plurality of light-blocking parts 20B1 may include the first light-blocking part 20B1A and the second light-blocking part 20B1B; along the direction Z perpendicular to the plane of the first substrate 201, the height HA of the first light-blocking part 20B1A may be greater than the height HB of the second light-blocking part 20B1B.

In one embodiment, it describes that when the light-blocking parts 20B1 included in the display anti-peep assembly 20B is disposed between the first electrode layer 204 and the second electrode layer 205 in the display anti-peep assembly 20B and reused as the support columns of the light-adjusting liquid crystal cell formed by the first substrate 201 and the second substrate 202, the light-blocking parts 20B1 may be configured to have different heights. For example, the plurality of light-blocking parts 20B1 may include the first light-blocking part 20B1A and the second light-blocking part 20B1B, and along the direction Z perpendicular to the plane of the first substrate 201, the height HA of the first light-blocking part 20B1A may be greater than the height HB of the second light-blocking part 20B1B. The side of the first light-blocking part 20B1A facing the second substrate 202 may be in contact with the second electrode layer 205, the side of the first light-blocking part 20B1A facing the first substrate 201 may be in contact with the first electrode layer 204, the side of the second light-blocking part 20B1B facing the second substrate 202 may be in contact with the second electrode layer 205, and the side of the second light-blocking part 20B1B facing the first substrate 201 may be not in contact with the first electrode layer 204, which realizes that the height HA of the first light-blocking part 20B1A may be greater than the height HB of the second light-blocking part 20B1B. The first light-blocking part 20B1A may block light leakage from the large viewing angle and also be used as a main photo spacer of the light-adjusting liquid crystal cell. The second light-blocking part 20B1B may block light leakage from the large viewing angle and also be used as a sub photo spacer of the light-adjusting liquid crystal cell. When the display anti-peep assembly 20B of the display module 000 is subjected to external pressure, the first light-blocking part 20B1A may first bear all pressure to be compressed. When the first light-blocking part 20B1A is compressed until the step difference between the first light-blocking part 20B1A and the second light-blocking part 20B1B is reduced to 0, the first light-blocking part 20B1A and the second light-blocking part 20B1B may jointly bear the external pressure and jointly support the light-adjusting liquid crystal cell formed by the first substrate 201 and the second substrate 202.

In some optional embodiments, referring to FIGS. 1-18, FIG. 18 illustrates another cross-sectional structural schematic along the A-A' direction in FIG. 1. In one embodiment, the plurality of light-blocking parts 20B1 may be disposed between the first electrode layer 204 and the second electrode layer 205, the side of the light-blocking part 20B1 facing the second substrate 202 may be in contact with the second electrode layer 205, and the side of the light-blocking part 20B1 facing the first substrate 201 may be in contact with the first electrode layer 204.

One light-blocking part 20B1 may include the first sub-light-blocking part 20B111 and the second sub-light-blocking part 20B112 which are arranged to be stacked with each other. The first sub-light-blocking part 20B111 may be disposed on the side of the first substrate 201 facing the second substrate 202, and the second sub-light-blocking part 20B112 may be disposed on the side of the second substrate 202 facing the first substrate 201.

Along the direction Z perpendicular to the plane of the first substrate 201, the first sub-light-blocking part 20B111 and the second sub-light-blocking part 20B112 may be overlapped and in contact with each other.

Figure 18:
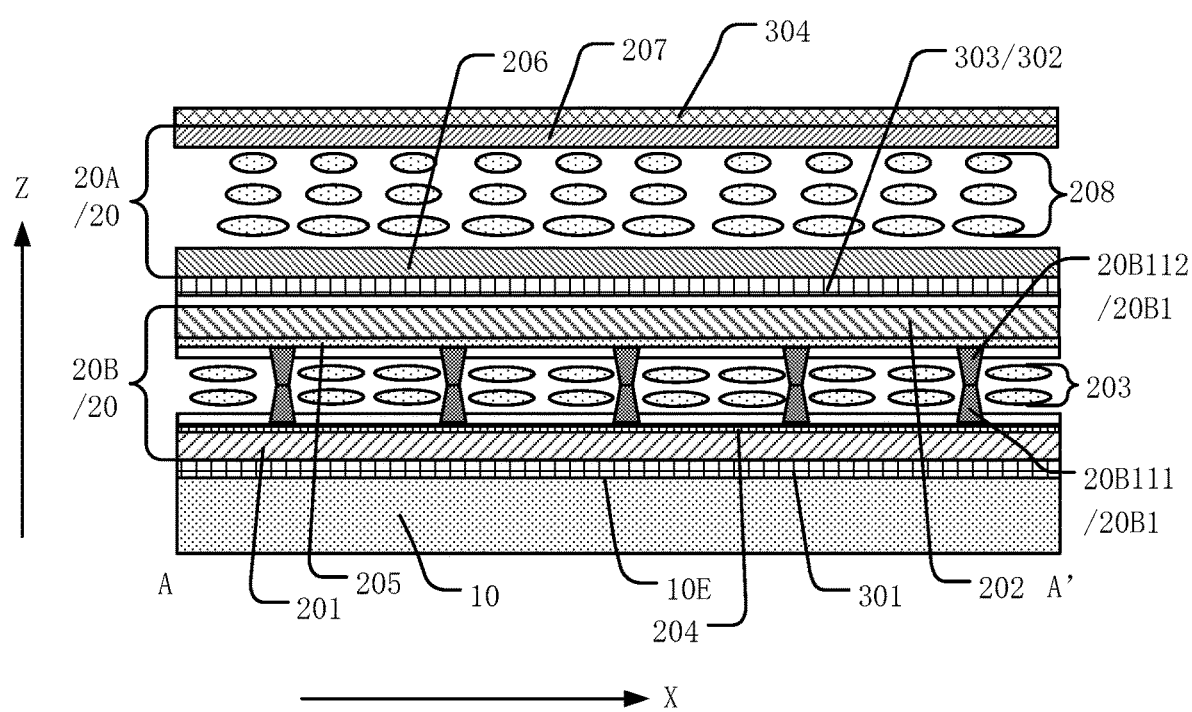
FIG. 18 illustrates another cross-sectional structural schematic along an A-A' direction in FIG. 1.

In one embodiment, it describes that when the light-blocking parts 20B1 included in the display anti-peep assembly 20B are disposed between the first electrode layer 204 and the second electrode layer 205 in the display anti-peep assembly 20B, the structure that the first sub-light-blocking part 20B111 and the second sub-light-blocking part 20B112 are stacked to form one light-blocking part 20B1 may be used. That is, one light-blocking part 20B1 may include the first sub-light-blocking part 20B111 and the second sub-light-blocking part 20B112 which are arranged to be stacked with each other. The first sub-light-blocking part 20B111 may be disposed on the side of the first substrate 201 facing the second substrate 202, and the second sub-light-blocking part 20B112 may be disposed on the side of the second substrate 202 facing the first substrate 201. Along the direction Z perpendicular to the plane of the first substrate 201, the first sub-light-blocking part 20B111 and the second sub-light-blocking part 20B112 may be overlapped and in contact with each other. Therefore, the first sub-light-blocking part 20B111 and the second sub-light-blocking part 20B112 may form a top-to-top structure (as shown in FIG. 18), which may reduce the difficulty of the fabrication process. The height of one light-blocking part 20B1 along the direction Z perpendicular to the plane of the first substrate 201 may be as high as possible, which may ensure that the light-blocking part 20B1 has desirable light-blocking effect and reduce the influence of the light-blocking part 20B1 on the transmittance of the display module 000.

Figure 19:
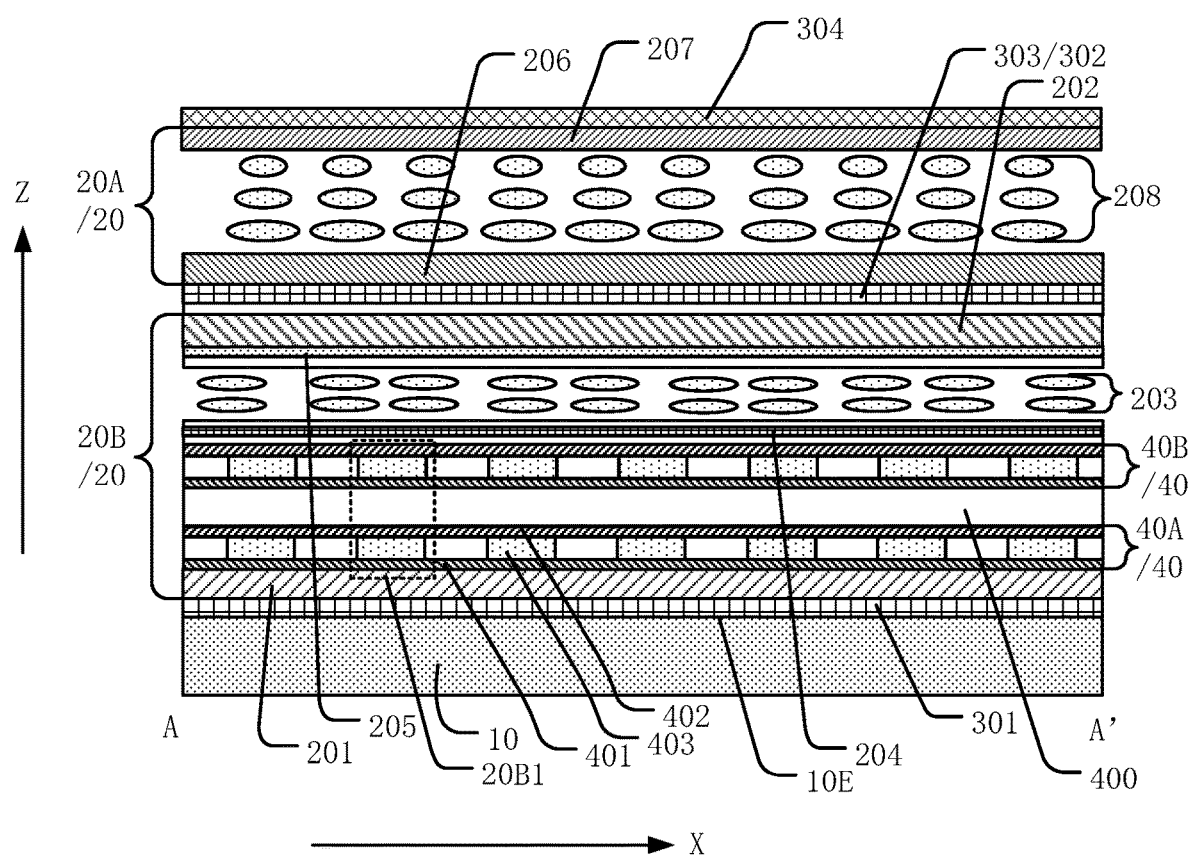
FIG. 19 illustrates another cross-sectional structural schematic along an A-A' direction in FIG. 1.
Figure 20:
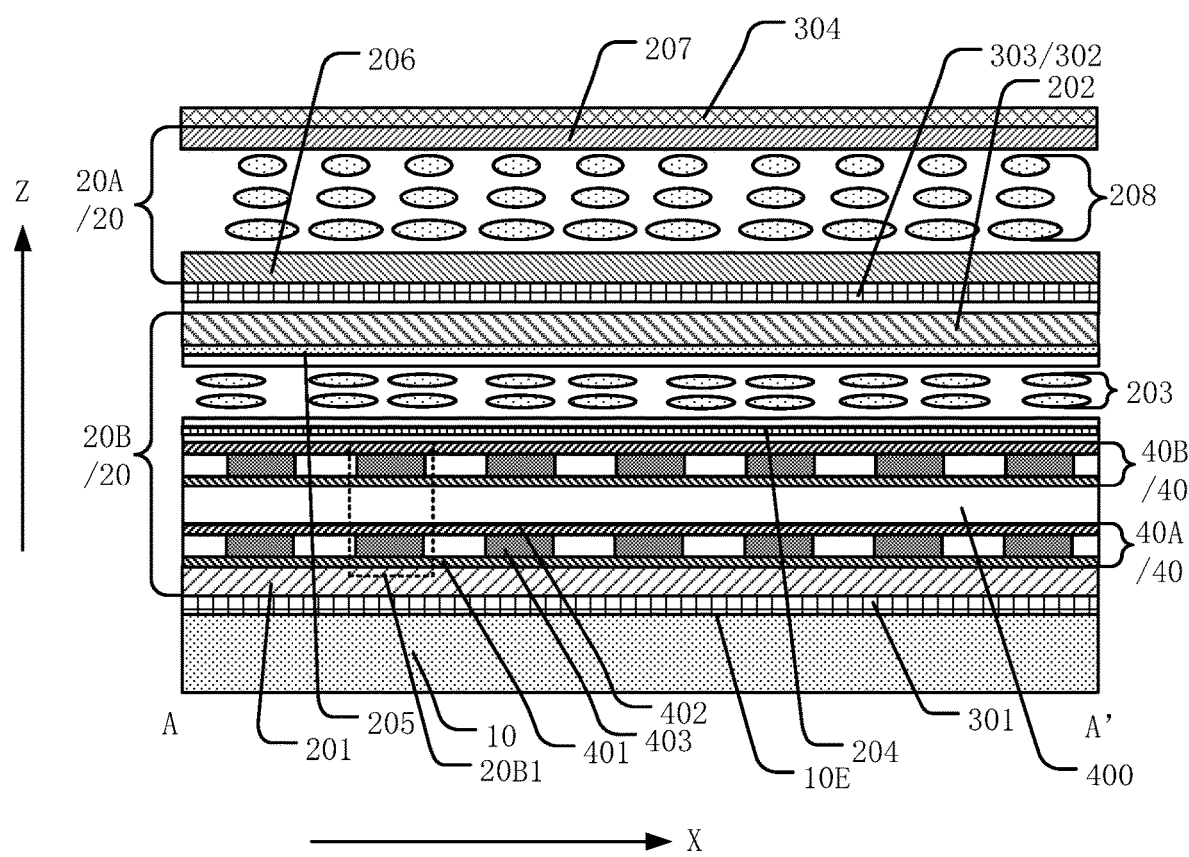
FIG. 20 illustrates another cross-sectional structural schematic along an A-A' direction in FIG. 1.

In some optional embodiments, referring to FIGS. 1, 19 and 20, FIG. 19 illustrates another cross-sectional structural schematic along the A-A' direction in FIG. 1; and FIG. 20 illustrates another cross-sectional structural schematic along the A-A' direction in FIG. 1. In one embodiment, the display anti-peep assembly 20B may include at least two electrochromic assemblies 40; and the second transparent insulating layer 400 may be between two electrochromic assemblies 40.

Each electrochromic assembly 40 may include the third electrode layer 401, the fourth electrode layer 402, and a plurality of electrochromic parts 403 between the third electrode layer 401 and the fourth electrode layer 402. Along the direction Z perpendicular to the plane of the first substrate 201, at least two electrochromic parts 403 may be overlapped with each other, and the plurality of electrochromic parts 403 arranged to be overlapped with each other may form one light-blocking part 20B1.

In one embodiment, it describes that when the display assembly 20A and the display anti-peep assembly 20B of the display anti-peep assembly 20 are independently disposed, the display assembly 20A may be the liquid crystal display panel, and the display anti-peep assembly 20B may be the light-adjusting liquid crystal cell including the plurality of light-blocking parts 20B1. For example, in addition to the plurality of light-blocking parts 20B1, the display anti-peep assembly 20B may further include the first substrate 201, the second substrate 202, and the first liquid crystal layer 203 between the first substrate 201 and the second substrate 202. The first substrate 201 may be on the side of the second substrate 202 facing the backlight assembly 10. That is, the first substrate 201 may be understood as the lower substrate of the display anti-peep assembly 20B, and the second substrate 202 may be understood as the upper substrate of the display anti-peep assembly 20B. The second electrode layer 205 may cooperate with the first electrode layer 204 to form an electric field that drives the deflection of liquid crystal molecules of the first liquid crystal layer 203 between the first substrate 201 and the second substrate 202, which may realize the switching between the wide viewing angle mode and the narrow viewing angle mode. The display anti-peep assembly 20B of one embodiment may further include at least two electrochromic assemblies 40. Optionally, two electrochromic assemblies 40 may be stacked with e each other along the direction Z perpendicular to the plane of the first substrate 201, and the second transparent insulating layer 400 may be between two electrochromic assemblies 40. In one embodiment, each electrochromic assembly 40 may be configured to include the third electrode layer 401, the fourth electrode layer 402, and the plurality of electrochromic parts 403 between the third electrode layer 401 and the fourth electrode layer 402. The electrochromic parts 403 may be a strip-shaped or mesh-shaped structure. The electrochromic parts 403 may be a strip-shaped structure arranged along the first direction X. One light-blocking part 20B1 in one embodiment may be formed by at least two overlapped electrochromic parts 403 along the direction Z perpendicular to the plane of the first substrate 201, which may provide light-blocking effect in the anti-peep mode. As shown in FIG. 19, when the first electrode layer 204 and the second electrode layer 205 of the display anti-peep assembly 20B control the display module 000 to be in the second display mode with the wide viewing angle, each electrochromic assembly 40 may include the first voltage difference between the third electrode layer 401 and the fourth electrode layer 402, and the electrochromic part 403 may be in a transparent state. At this point, the electrochromic assembly 40 may directly transmit light without blocking the light with the wide viewing angle. As shown in FIG. 20 (it can be understood that in FIGS. 19 and 20, the non-transparent state and the transparent state are distinguished by different filling patterns of the electrochromic parts 403), when the first electrode layer 204 and the second electrode layer 205 of the display anti-peep assembly 20B control the display module 000 to be in the first display mode with the narrow viewing angle, each electrochromic assembly 40 may include the second voltage difference between the third electrode layer 401 and the fourth electrode layer 402, and the electrochromic part 403 may be in a black state (or a dark color that is similar to the black state). At this point, the electrochromic part 403 may block the leaked light under the large viewing angle, so that the brightness of the oblique large viewing angle may be reduced; the light-blocking part 20B1 formed by overlapped electrochromic parts 403 may have desirable light-blocking effect; and the light at the large viewing angle in the anti-peep mode, especially the light at the viewing angle greater than or equal to 45 degrees, may be blocked to reduce the brightness of the display picture when viewing the display picture under the large viewing angle, which may be beneficial for ensuring the anti-peep effect in the anti-peep mode.

It can be understood that the material for the electrochromic part 403 may not be limited in one embodiment and may be metal oxides, such as iridium oxide (IrO2), molybdenum trioxide (MoO3), tungsten trioxide (WO3) and the like, and also be other electrochromic materials that can present different transparent and non-transparent states under different voltage differences. The electrochromic part 403 may not be limited in on embodiment and may be selected and fabricated according to actual needs during an implementation.

In some optional embodiments, referring to FIGS. 1, 19 and 20, the third electrode layer 401 may have an entire-surface structure; and/or, the fourth electrode layer 402 may have an entire-surface structure.

In one embodiment, it describes that the third electrode layer 401 configured to control the color change of the electrochromic part 403 in each electrochromic assembly 40 may be an entire-surface structure, so that the voltage value of the third electrode layer 401 may be changed as a whole. At this point, the voltage value of the fourth electrode layer 402 may be a constant value without being changed, and the voltage difference between the third electrode layer 401 and the fourth electrode layer 402 may be changed, so that the electrochromic part 403 may be reversibly changed between a transparent state and a non-transparent state. Or the fourth electrode layer 402 configured to control the color change of the electrochromic part 403 in each electrochromic assembly 40 may be an entire-surface structure, so that the voltage value of the fourth electrode layer 402 may be changed as a whole. At this point, the voltage value of the third electrode layer 401 may be a constant value without being changed, and the voltage difference between the third electrode layer 401 and the fourth electrode layer 402 may be adjusted, so that the electrochromic part 403 may be reversibly changed between a transparent state and a non-transparent state. Or the third electrode layer 401 and the fourth electrode layer 402 for controlling the color change of the electrochromic part 403 in each electrochromic assembly 40 may both be a full-surface structure, and the voltage value of the third electrode layer 401 may be changed as a whole. At this point, the voltage value of the fourth electrode layer 402 may be a fixed value without being changed (or the voltage value of the fourth electrode layer 402 may be changed as a whole, and the voltage value of the third electrode layer 401 may be a fixed value without being changed). Furthermore, the voltage difference between the third electrode layer 401 and the fourth electrode layer 402 may be adjusted, so that the electrochromic part 403 may be reversibly changed between a transparent state and a non-transparent state. In one embodiment, the third electrode layer 401 and/or the fourth electrode layer 402 in each electrochromic assembly 40 may be configured as a whole surface structure, which may be beneficial for avoiding the etching process of the electrode layer, saving the fabrication cost and improving the process efficiency.

Figure 21:
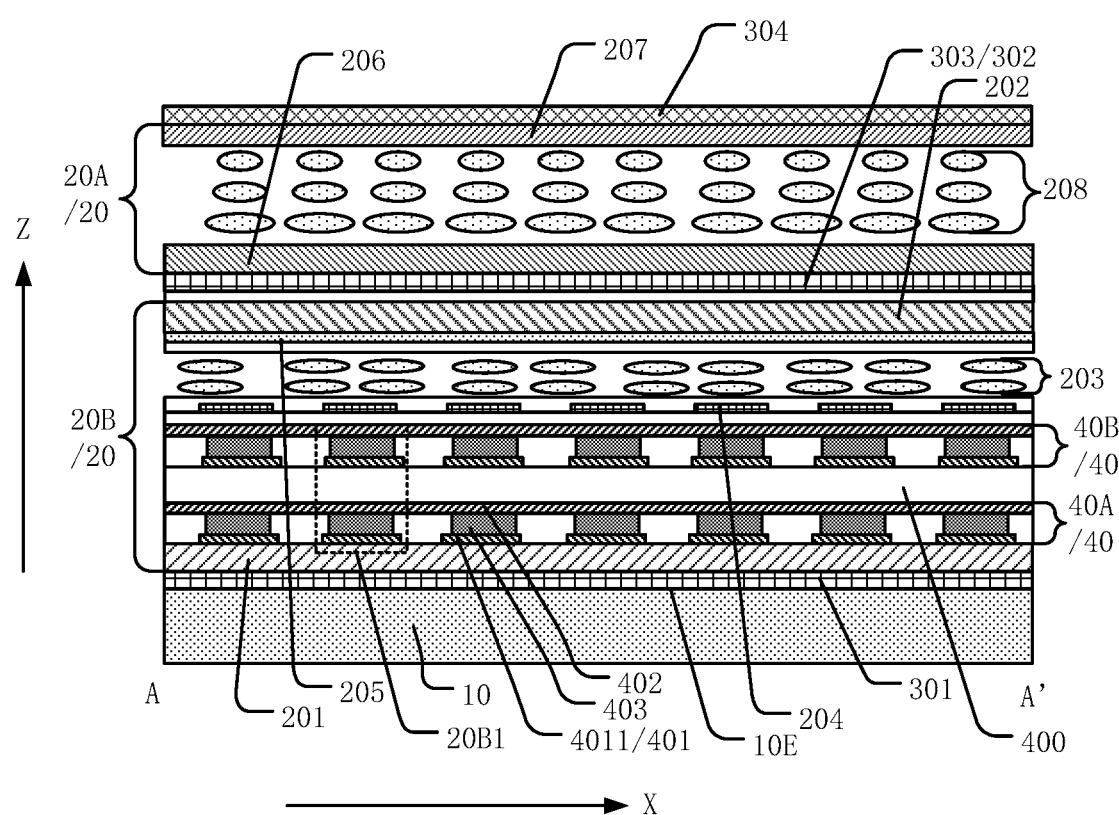
FIG. 21 illustrates another cross-sectional structural schematic along an A-A' direction in FIG. 1.
Figure 22:
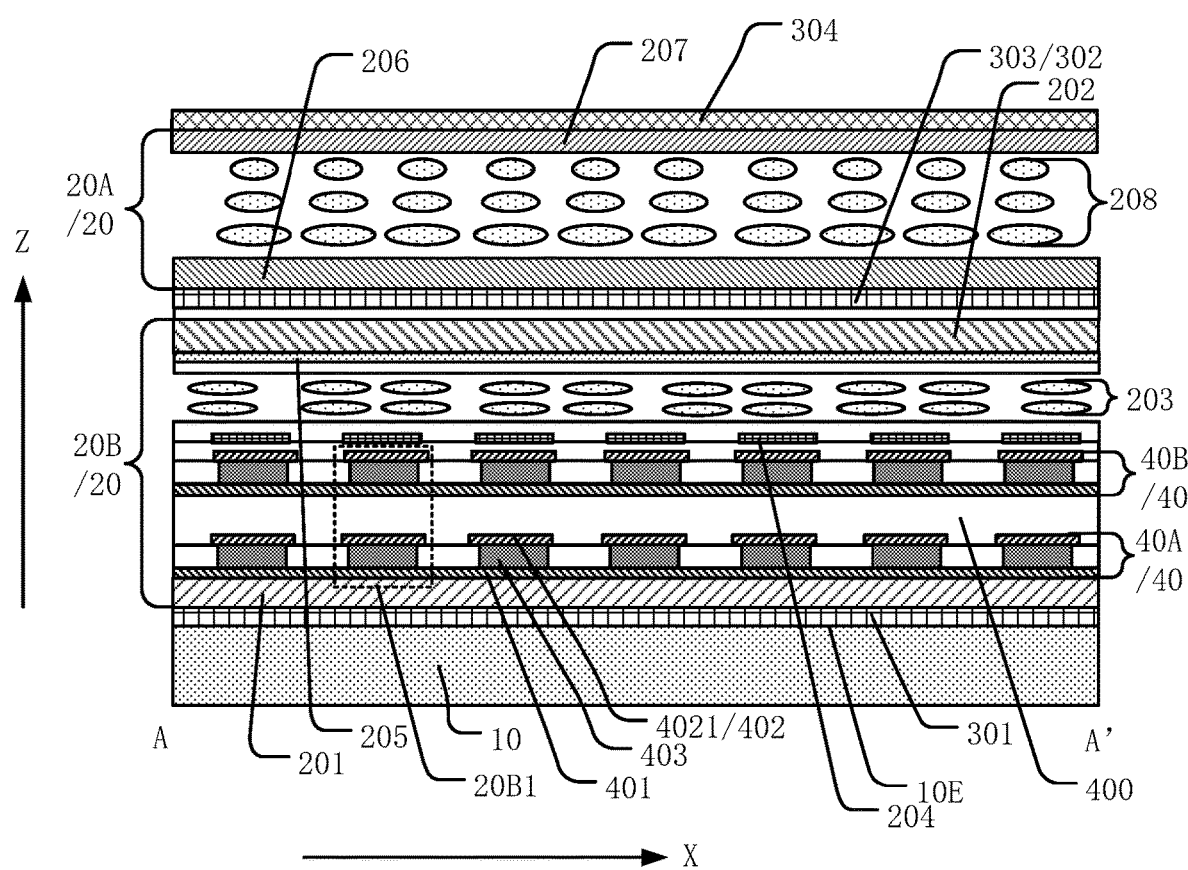
FIG. 22 illustrates another cross-sectional structural schematic along an A-A' direction in FIG. 1.
Figure 23:
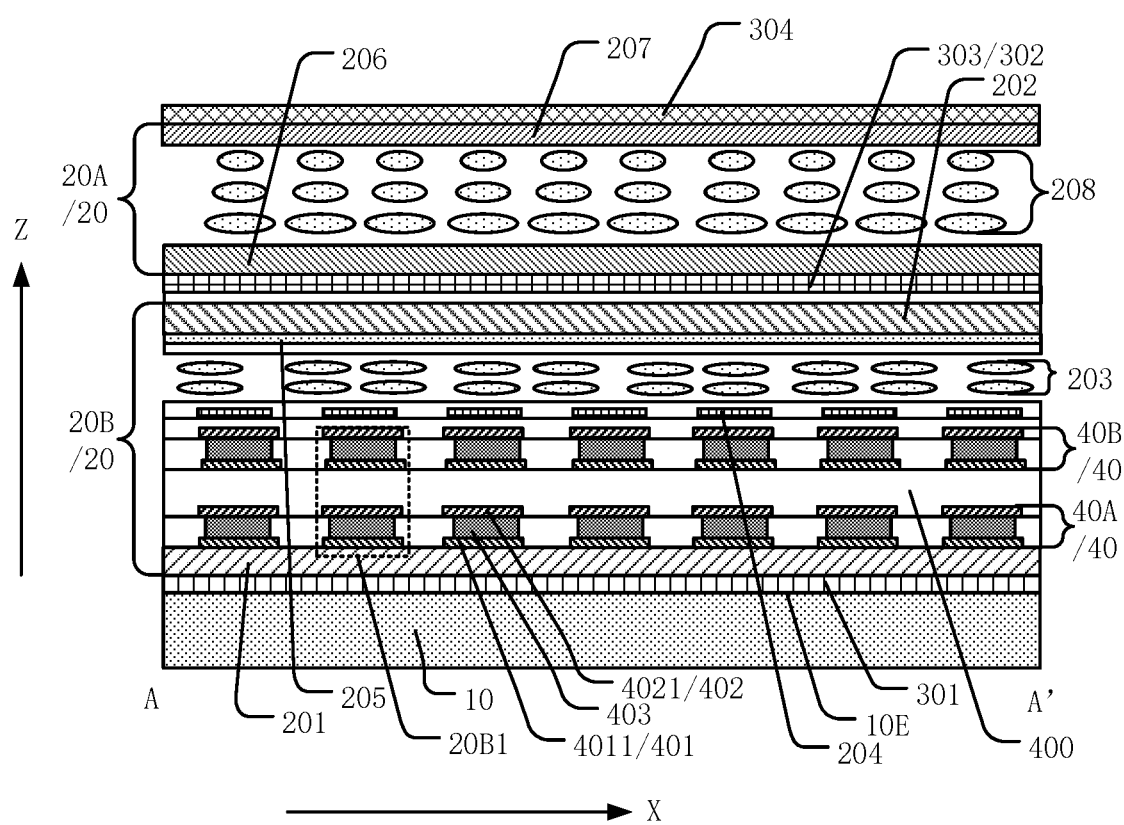
FIG. 23 illustrates another cross-sectional structural schematic along an A-A' direction in FIG. 1.

In some optional embodiments, referring to FIGS. 1, 21, 22 and 23, FIG. 21 illustrates another cross-sectional structural schematic along the A-A' direction in FIG. 1; FIG. 22 illustrates another cross-sectional structural schematic along the A-A' direction in FIG. 1; and FIG. 23 illustrates another cross-sectional structural schematic along the A-A' direction in FIG. 1. In one embodiment, in each electrochromic assembly 40, the third electrode layer 401 may include a plurality of third electrodes 4011, and the orthographic projection of the third electrode 4011 on the first substrate 201 may cover the orthographic projection of the electrochromic part 403 on the first substrate 201; and/or in each electrochromic assembly 40, the fourth electrode layer 402 may include a plurality of fourth electrodes 4021; and the orthographic projection of the fourth electrode 4021 on the first substrate 201 may cover the orthographic projection of the electrochromic part 403 on the first substrate 201.

In one embodiment, it describes that the third electrode layer 401 and/or the fourth electrode layer 402 for controlling the color change of the electrochromic part 403 in each electrochromic assembly 40 may also be a patterned structure. For example, as shown in FIG. 21, in each electrochromic assembly 40, the third electrode layer 401 may include the plurality of third electrodes 4011, and the orthographic projection of the third electrode 4011 on the first substrate 201 may cover the orthographic projection of the electrochromic part 403 on the first substrate 201. That is, the pattern of the orthographic projection of the third electrode 4011 on the first substrate 201 may be consistent with the pattern of the orthographic projection of the light-blocking part 20B1 on the first substrate 201, and the area of the orthographic projection of the third electrode 4011 on the first substrate 201 may be slightly larger than the area of the orthographic projection of the electrochromic part 403 on the first substrate 201. Therefore, the orthographic projection of the third electrode 4011 on the first substrate 201 may cover the orthographic projection of the electrochromic part 403 on the first substrate 201, which may ensure that each electrochromic part 403 may be covered by the third electrode 4011 and also ensure the light-blocking effect when the electrochromic part 403 is used as the light-blocking part 20B1. At this point, the fourth electrode layer 402 may be a full-surface structure or a patterned structure. Or as shown in FIG. 22, in each electrochromic assembly 40, the fourth electrode layer 402 may include the plurality of fourth electrodes 4021, and the orthographic projection of the fourth electrode 4021 on the first substrate 201 may cover the orthographic projection of the electrochromic part 403 on the first substrate 201. That is, the pattern of the orthographic projection of the fourth electrode 4021 on the first substrate 201 may be consistent with the pattern of the orthographic projection of the light-blocking part 20B1 on the first substrate 201, and the orthographic projection area of the fourth electrode 4021 on the first substrate 201 may be slightly larger than the orthographic projection area of the electrochromic part 403 on the first substrate 201. Therefore, the orthographic projection of the fourth electrode 4021 on the first substrate 201 may cover the orthographic projection of the electrochromic part 403 on the first substrate 201, which may ensure that each electrochromic part 403 may be covered by the fourth electrode 4021 and also ensure the light-blocking effect when the electrochromic part 403 is used as the light-blocking part 20B1. At this point, the third electrode layer 401 may be an entire-surface structure or a patterned structure. Or as shown in FIG. 23, in each electrochromic assembly 40, the third electrode layer 401 may include the plurality of third electrodes 4011; the orthographic projection of the third electrode 4011 on the first substrate 201 may cover the orthographic projection of the electrochromic part 403 on the first substrate 201; in each electrochromic assembly 40, the fourth electrode layer 402 may include the plurality of fourth electrodes 4021, and the orthographic projection of the fourth electrode 4021 on the first substrate 201 may cover the orthographic projection of the electrochromic part 403 on the first substrate 201. That is, the patterns of the orthographic projections of the third electrode 4011 and the fourth electrode 4021 on the first substrate 201 may both be consistent with the pattern of the orthographic projection of the light-blocking part 20B1 on the first substrate 201; and the areas of the orthographic projections of the third electrode 4011 and the fourth electrode 4021 on the first substrate 201 may both be slightly larger than the area of the orthographic projection of the electrochromic part 403 on the first substrate 201. Therefore, the orthographic projections of the third electrode 4011 and the fourth electrode 4021 on the first substrate 201 may cover the orthographic projection of the electrochromic part 403 on the first substrate 201, which may ensure that each electrochromic part 403 may be covered by the third electrode 4011 and the fourth electrode 4021 and also ensure the light-blocking effect when the electrochromic part 403 is used as the light-blocking part 20B1.

In one embodiment, it configures that in each electrochromic assembly 40, the third electrode layer 401 may include the plurality of third electrodes 4011, and/or the fourth electrode layer 402 may include the plurality of fourth electrodes 4021, which may ensure that each electrochromic part 403 may have electrodes above and below each electrochromic assembly to control voltage difference, which may change the transparent state and non-transparent state of each electrochromic assembly. Although the third electrode layer 401 and the fourth electrode layer 402 may be made of transparent conductive materials, the transparent conductive materials may not be completely transparent, which may affect the transmittance to a certain extent. Therefore, in one embodiment, the transmittance of the display anti-peep assembly 20B may be further improved by patterning the third electrode layer 401 and/or the fourth electrode layer 402, which may further be beneficial for improving the light transmittance of entire display module 000 and ensuring the display effect.

Optionally, as shown in FIGS. 21-23, when the third electrode layer 401 in one embodiment includes the plurality of third electrodes 401 and/or the fourth electrode layer 402 includes the plurality of fourth electrodes 4021, one of the first electrode layer 204 and the second electrode layer 205 for controlling the deflection of the first liquid crystal layer 203 of the display anti-peep assembly 20B may also be configured to have a same pattern as the electrochromic part 403, such as strip-shaped electrochromic part 403. Therefore, one of the first electrode layer 204 and the second electrode layer 205 may also have electrodes configured as strip-shaped, which may be beneficial for further improving the light transmittance of entire module.

Optionally, as shown in FIGS. 1 and 20-23, along the direction Z perpendicular to the plane of the first substrate 201, two electrochromic assemblies 40 may be on a same side of the first liquid crystal layer 203, optionally, on the side of the first liquid crystal layer 203 facing the first substrate 201, so that the electrochromic assemblies 40 may be both on a same side of the first liquid crystal layer 203.

Figure 24:
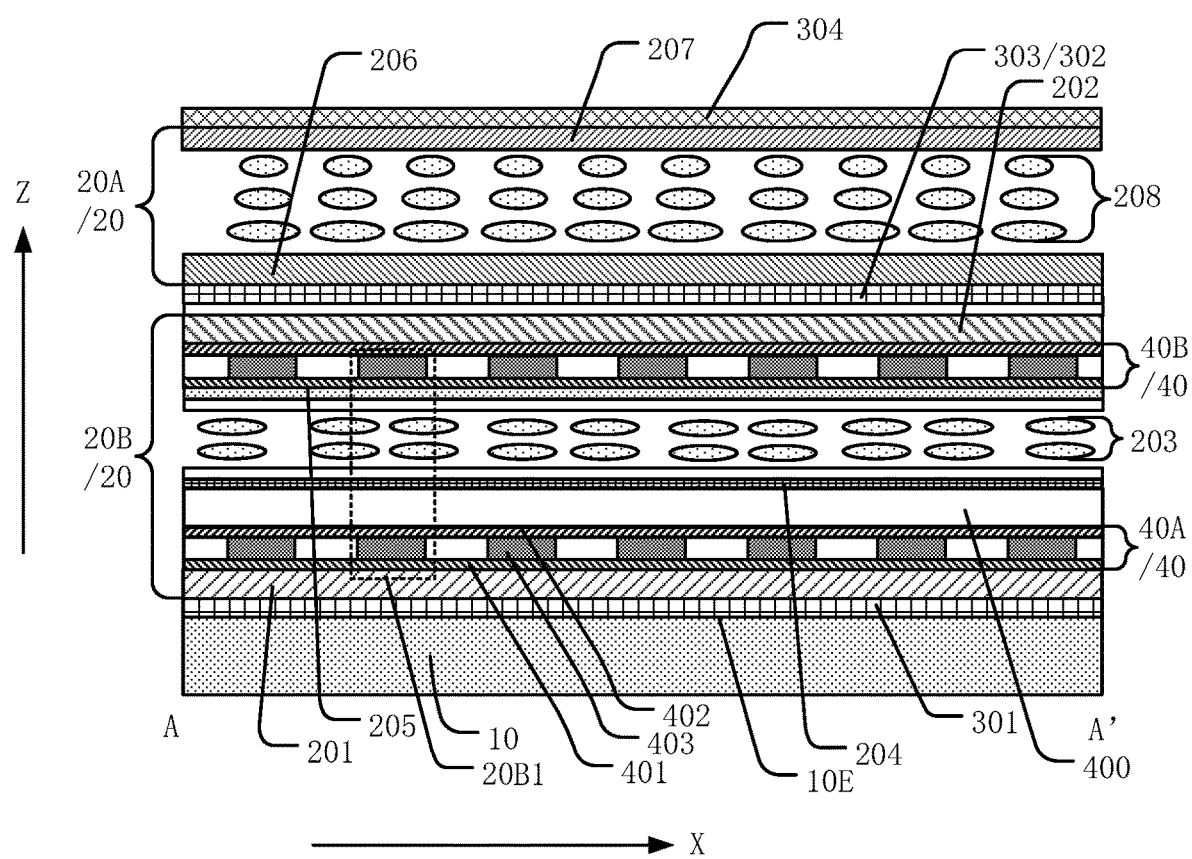
FIG. 24 illustrates another cross-sectional structural schematic along an A-A' direction in FIG. 1.

Optionally, referring to FIGS. 1 and 24, FIG. 24 illustrates another cross-sectional structural schematic along the A-A' direction in FIG. 1. In one embodiment, along the direction Z perpendicular to the plane of the first substrate 201, two electrochromic assemblies 40 may be respectively on different sides of the first liquid crystal layer 203.

In one embodiment, it describes that at least two electrochromic assemblies 40 may be disposed in the display anti-peep assembly 20B; and by changing the voltage difference between the third electrode layer 401 and the fourth electrode layer 402 included in each electrochromic assembly 40, the electrochromic part 403 may be changed between a non-transparent state and a transparent state. When the electrochromic part 403 is in the dark state of the non-transparent state, the electrochromic parts 403 arranged to be overlapped with each other may be used as the light-blocking part 20B at this point to block leaked light under the large viewing angle to reduce the brightness of the oblique large viewing angle, and the light-blocking part 20B1 formed by overlapped electrochromic parts 403 may have desirable light-blocking effect and block the light with the large viewing angle in the anti-peep mode, especially the light with the viewing angle greater than or equal to 45 degrees, which may reduce the brightness of the display picture under the large viewing angle and may be beneficial for ensuring the anti-peep effect in the anti-peep mode. When the display anti-peep assembly 20B includes two electrochromic assemblies 40, along the direction Z perpendicular to the plane of the first substrate 201, two electrochromic assemblies 40 may be respectively on different sides of the first liquid crystal layer 203. Therefore, the first liquid crystal layer 203 may be between two electrochromic parts 403 along the direction Z perpendicular to the plane of the first substrate 201, which may realize the height difference between two electrochromic parts 403 along the direction Z perpendicular to the plane of the first substrate 201 and ensure the blocking effect of one light-blocking part 20B, formed by two electrochromic parts 403 overlapped with each other at a same position, on the light leakage under the large viewing angle.

In some optional embodiments, referring to FIGS. 1, and 19-24, two electrochromic assemblies 40 may include the first electrochromic assembly 40A and the second electrochromic assembly 40B; the third electrode layer 401 of the first electrochromic assembly 40A may be electrically connected to the third electrode layer 401 of the second electrochromic assembly 40B; and the fourth electrode layer 402 of the first electrochromic assembly 40A may be electrically connected to the fourth electrode layer 402 of the second electrochromic assembly 40B.

In one embodiment, it describe that at least two electrochromic assemblies 40 may be disposed in the display anti-peep assembly 20B; and by changing the voltage difference between the third electrode layer 401 and the fourth electrode layer 402 included in each electrochromic assembly 40, the electrochromic part 403 may be changed between a non-transparent state and a transparent state. At least two overlapped electrochromic parts 403 of such structure may form one light-blocking part 20B1. When blocking leaked light under the large viewing angle, for example, if two electrochromic assemblies 40 include the first electrochromic assembly 40A and the second electrochromic assembly 40B, the third electrode layer 401 of the first electrochromic assembly 40A may be electrically connected to the third electrode layer 401 of the second electrochromic assembly 40B, and the fourth electrode layer 402 of the first electrochromic assembly 40A may be electrically connected to the fourth electrode layer 402 of the second electrochromic assembly 40B. The electrode layers connected to a same voltage value in different electrochromic assemblies 40 may be connected to each other, so that the quantity of peripheral signal lines (the peripheral signal lines are used to provide voltage signals to the electrode layers) in the display module 000 may be reduced, which may further be beneficial for reducing the frame of the display module 000.

It can be understood that in one embodiment, the electrical connection between the third electrode layer 401 of the first electrochromic assembly 40A and the third electrode layer 401 of the second electrochromic assembly 40B may be realized by punching holes at the film layer (e.g., the second transparent insulating layer 400) between two third electrode layers 401 to realize the electrical connection between two electrode layers, or by a same conductive line at the frame position of the display module 000 (not shown in drawings), which may not be limited in one embodiment and may be configured according to actual requirements in an implementation.

Figure 25:
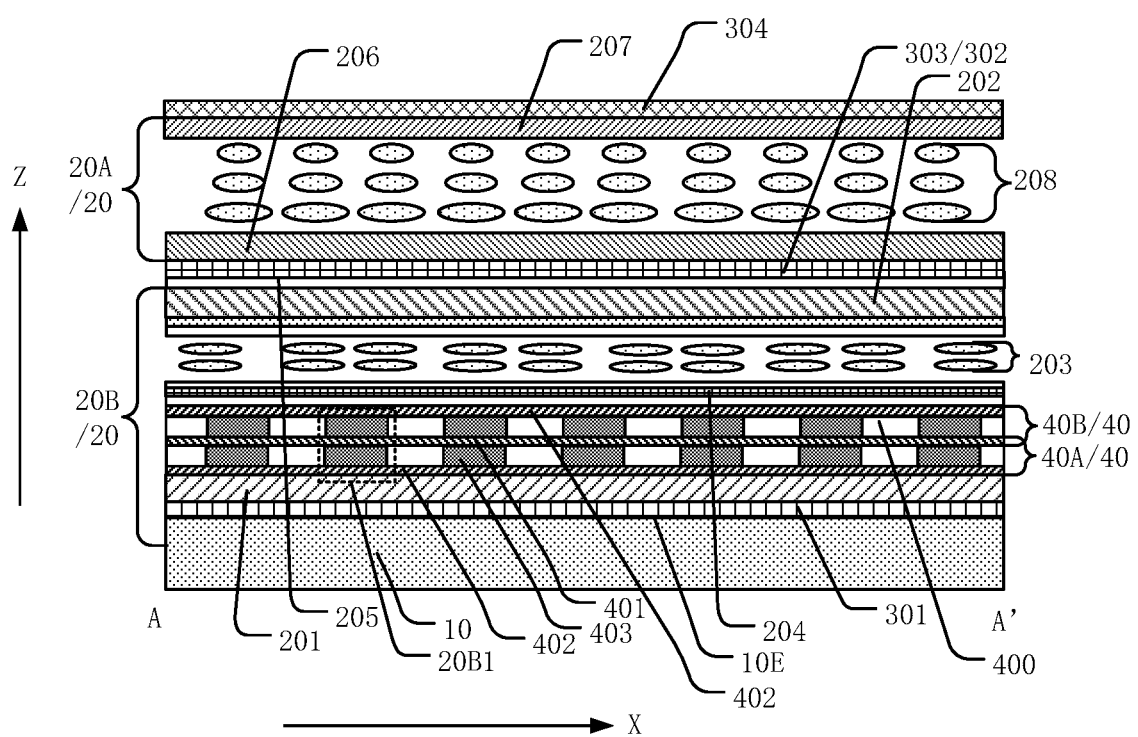
FIG. 25 illustrates another cross-sectional structural schematic along an A-A' direction in FIG. 1.

Optionally, referring to FIGS. 1 and 25, FIG. 25 illustrates another cross-sectional structural schematic along the A-A' direction in FIG. 1. In one embodiment, the third electrode layer 401 of the first electrochromic assembly 40A and the third electrode layer 401 of the second electrochromic assembly 40B may share one electrode layer. That is, both the first electrochromic assembly 40A and the second electrochromic assembly 40B may be disposed on the side of the first substrate 201 facing the second substrate 202. When the first electrochromic assembly 40A and the second electrochromic assembly 40B are stacked with each other, the third electrode layer 401 of the first electrochromic assembly 40A and the third electrode layer 401 of the second electrochromic assembly 40B may be a same electrode layer, so that the second transparent insulating layer 400 may be omitted. The third electrode layer 401 of two electrochromic assemblies 40 may be shared, that is, the third electrode layer 401 of the first electrochromic assembly 40A and the third electrode layer 401 of the second electrochromic assembly 40B may be connected to same signals. The voltage value of the fourth electrode layer 402 of the first electrochromic assembly 40A and the voltage value of the fourth electrode layer 402 of the second electrochromic assembly 40B may only need to be changed respectively to realize adjustment of the transparent state and the non-transparent state of the electrochromic part 403 in the first electrochromic assembly 40A and the second electrochromic assembly 40B, which may be beneficial for further reducing overall thickness of the module.

In some optional embodiments, referring to FIG. 1 to FIG. 25, at least one electrochromic assembly 40 may be between the first electrode layer 204 and the first substrate 201.

In one embodiment, it describes that among at least two electrochromic assemblies 40 included in the display anti-peep assembly 20B, at least one electrochromic assembly 40 may be between the first electrode layer 204 and the first substrate 201. If two electrochromic assemblies 40 are on the side of the first substrate 201 facing the second substrate 202, two electrochromic assemblies 40 may be between the first electrode layer 204 and the first substrate 201. If two electrochromic assemblies 40 are on two sides of the first liquid crystal layer 203, one electrochromic assembly 40 may be between the first electrode layer 204 and the first substrate 201, and another electrochromic assembly 40 may be between the second electrode layer 205 and the second substrate 202. Therefore, the electric field formed between the third electrode layer 401 and the fourth electrode layer 402 in the electrochromic assembly 40 may be prevented from affecting the electric field between the first electrode layer 204 and the second electrode layer 205 of the display anti-peep assembly 20B, which may be beneficial for ensuring the deflection effect of the first liquid crystal layer 203 in the display anti-peep assembly 20B used as the light-adjusting liquid crystal cell.

Figure 26:
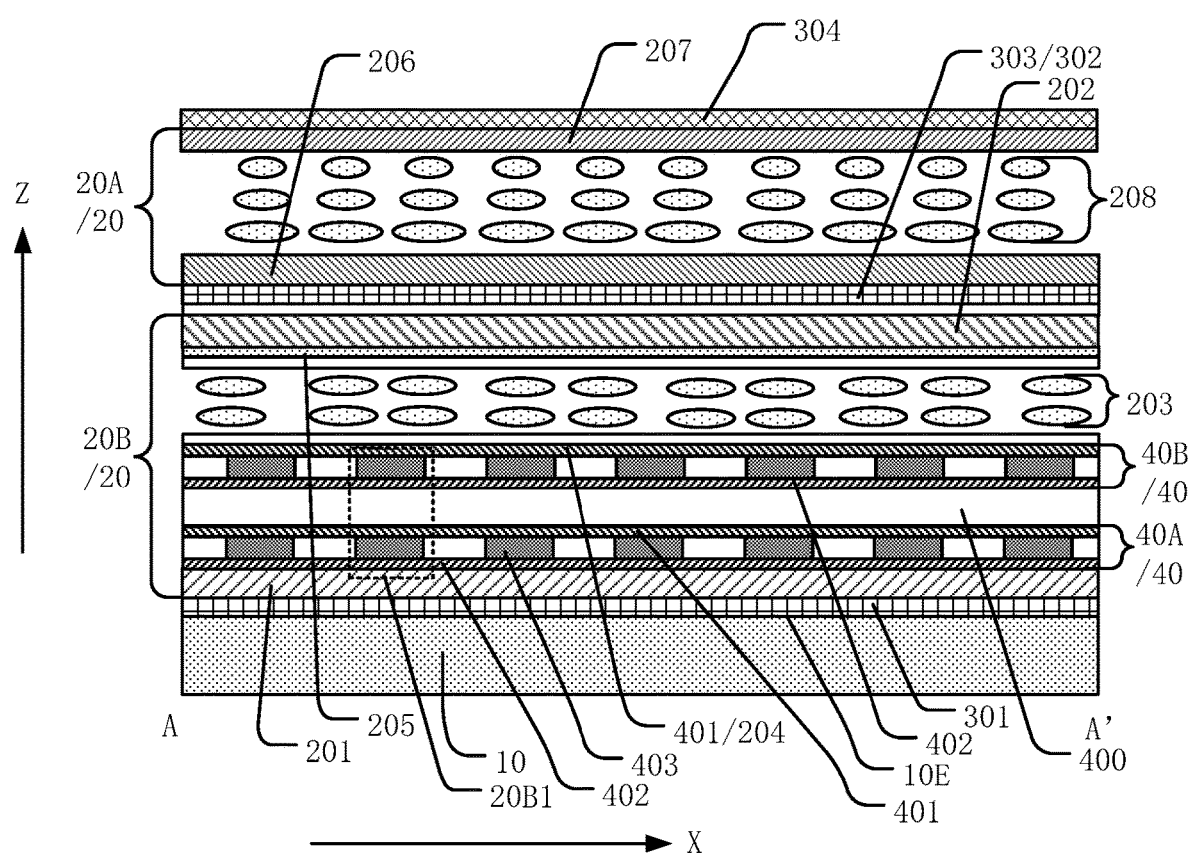
FIG. 26 illustrates another cross-sectional structural schematic along an A-A' direction in FIG. 1.

In some optional embodiments, referring to FIGS. 1 and 26, FIG. 26 illustrates another cross-sectional structural schematic along the A-A' direction in FIG. 1. In one embodiment, the third electrode layer 401 may be on the side of the electrochromic part 403 away from the first substrate 201; and the first electrode layer 204 may be reused as the third electrode layer 401.

In one embodiment, it describes that when at least one electrochromic assembly 40 is between the first electrode layer 204 and the first substrate 201, in one electrochromic assembly 40 closest to the first electrode layer 204, the third electrode layer 401 of the electrochromic assembly 40 may be on the side of the electrochromic part 403 away from the first substrate 201. That is, the third electrode layer 401 of the electrochromic assembly 40 may be farther away from the first substrate 201 than the fourth electrode layer 402 of the electrochromic assembly 40. At this point, the first electrode layer 204 may be reused into the third electrode layer 401. That is, the first electrode layer 204 for controlling the deflection of liquid crystal molecules in the first liquid crystal layer 203 and the third electrode layer 401 for controlling the color change of the electrochromic part 403 may be a same electrode layer. When the first electrode layer 204 and the third electrode layer 401 share one electrode layer, a fixed voltage value may be connected. By changing the voltage value of the second electrode layer 205, the deflection of the liquid crystal molecules of the first liquid crystal layer 203 may be realized, thereby realizing free switching between the wide viewing angle display mode and the narrow viewing angle display mode. For the electrochromic assembly 40, switching between the transparent state and the non-transparent state of the electrochromic part 403 may be realized by changing the voltage value of the fourth electrode layer 402, thereby further reducing the thickness of the display module 000 and overall volume of the module.

Optionally, as shown in FIG. 26, in one embodiment, the first electrode layer 204 for controlling the deflection of liquid crystal molecules in the first liquid crystal layer 203 and the third electrode layer 401 for controlling the color change of the electrochromic part 403 may be used as a same electrode layer; one electrode layer shared by the first electrode layer 204 and the third electrode layer 401 may be an entire-surface structure; and when the first electrode layer 204 and the third electrode layer 401 share one electrode layer, a fixed voltage value may be connected. When the liquid crystal molecules of the first liquid crystal layer 203 are deflected by changing the voltage value of the second electrode layer 205, the second electrode layer 205 may be an entire surface electrode, which may not be limited in one embodiment and may be configured according to actual requirements in an implementation.

Figure 27:
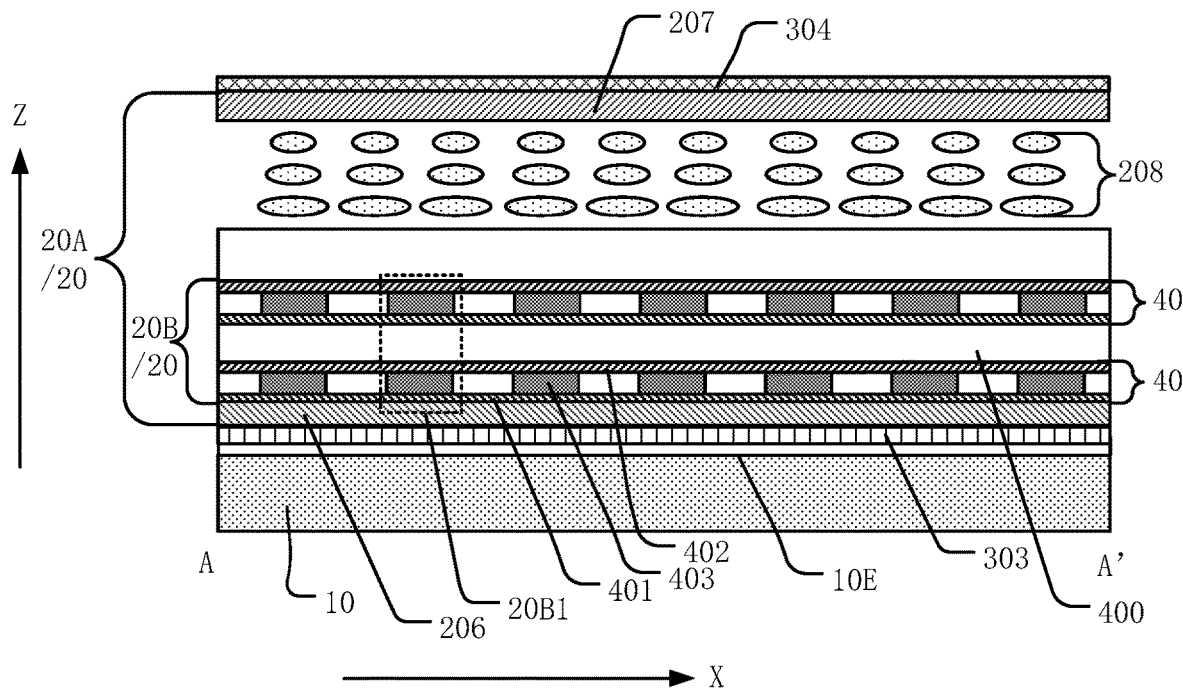
FIG. 27 illustrates another cross-sectional structural schematic along an A-A' direction in FIG. 1.
Figure 28:
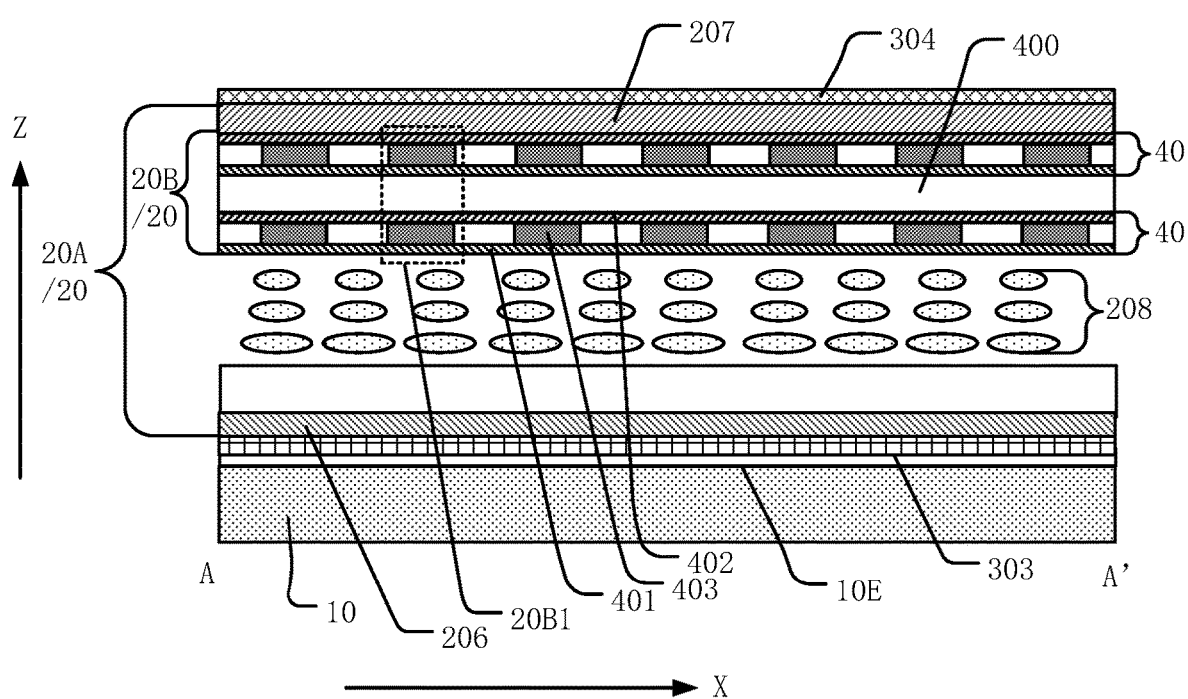
FIG. 28 illustrates another cross-sectional structural schematic along an A-A' direction in FIG. 1.

In some optional embodiments, referring to FIGS. 1, 27, and 28, FIG. 27 illustrates another cross-sectional structural schematic along the A-A' direction in FIG. 1; and FIG. 28 illustrates another cross-sectional structural schematic along the A-A' direction in FIG. 1. In one embodiment, the display anti-peep assembly 20B may be integrated in the display assembly 20A.

The display assembly 20A may include the third substrate 206, the fourth substrate 207, and the second liquid crystal layer 208 between the third substrate 206 and the fourth substrate 207.

As shown in FIG. 27, the display anti-peep assembly 20B may be disposed on the side of the third substrate 206 facing the fourth substrate 207; or as shown in FIG. 28, the display anti-peep assembly 20B may be disposed on the side of the fourth substrate 207 facing the third substrate 206.

The display anti-peep assembly 20B may include at least two electrochromic assemblies 40; and the second transparent insulating layer 400 may be between two electrochromic assemblies 40.

One electrochromic assembly 40 may include the third electrode layer 401, the fourth electrode layer 402, and the electrochromic part 403 between the third electrode layer 401 and the fourth electrode layer 402.

Along the direction Z perpendicular to the plane of the display module 000, at least two electrochromic parts 403 may be overlapped with each other, and the plurality of electrochromic parts 403 arranged to be overlapped with each other may form one light-blocking part 20B1.

In one embodiment, it describes that the display anti-peep assembly 20B in the display anti-peep assembly 20 may be integrated in the display assembly 20A, and the display assembly 20A may be a liquid crystal display panel. Optionally, the display assembly 20A may include the third substrate 206, the fourth substrate 207, and the second liquid crystal layer 208 between the third substrate 206 and the fourth substrate 207. The third substrate 206 may be understood as the base substrate of the array substrate, and the fourth substrate 207 may be understood as the base substrate of the color filter substrate. It can be understood that specific film structure of the display assembly 20A may not be described in detail in one embodiment. The display assembly 20A may further include scan lines, data lines, pixel electrodes, common electrodes and the like on the third substrate 206, and may also include color resist structures, black matrix structures and the like on the fourth substrate 207 (not shown in drawings), which may not be described in detail in one embodiment and may be understood with reference to the structure of the liquid crystal display panel in the existing technology.

When the display anti-peep assembly 20B in one embodiment is integrated in the display assembly 20A of the liquid crystal display panel structure, the display anti-peep assembly 20B may be disposed on the side of the third substrate 206 facing the fourth substrate 207 (as shown in FIG. 27); or the display anti-peep assembly 20B may also be disposed on the side of the fourth substrate 207 facing the third substrate 206 (as shown in FIG. 28). At this point, the display anti-peep assembly 20B may be a structure including at least two electrochromic assemblies 40, and the second transparent insulating layer 400 may be between two electrochromic assemblies 40. Each electrochromic assembly 40 may include the third electrode layer 401, the fourth electrode layer 402, and the plurality of electrochromic parts 403 between the third electrode layer 401 and the fourth electrode layer 402. The electrochromic part 403 may be a strip-shaped or mesh-shaped structure. The electrochromic part 403 may be a strip-shaped structure arranged along the first direction X. One light-blocking part 20B1 in one embodiment may be formed by at least two electrochromic parts 403 overlapped with each other along the direction Z perpendicular to the plane of the display module 000, and the light-blocking part 20B1 formed by at least two overlapped electrochromic parts 403 may be one light-blocking part 20B1 having reversible color change.

Figure 29:
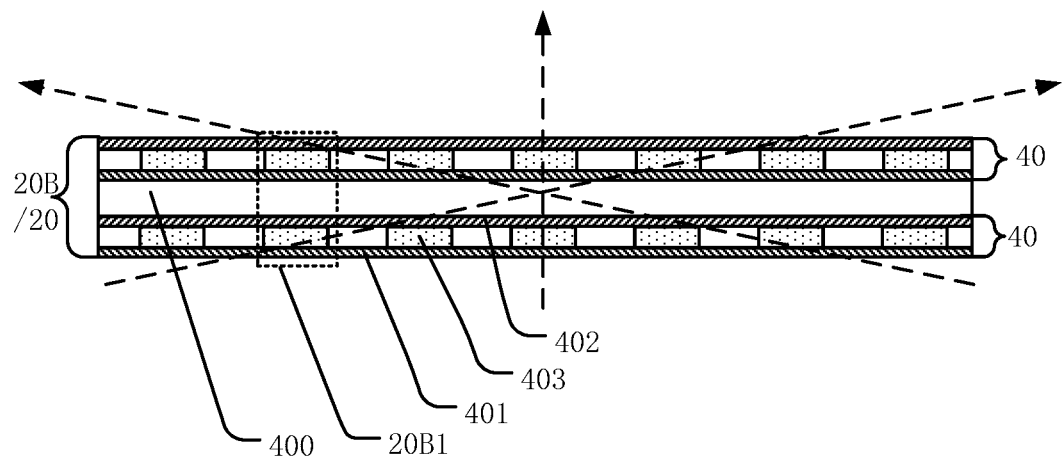
FIG. 29 illustrates a light transmission schematic of an anti-peep assembly in a second display mode in FIG. 27.
Figure 30:
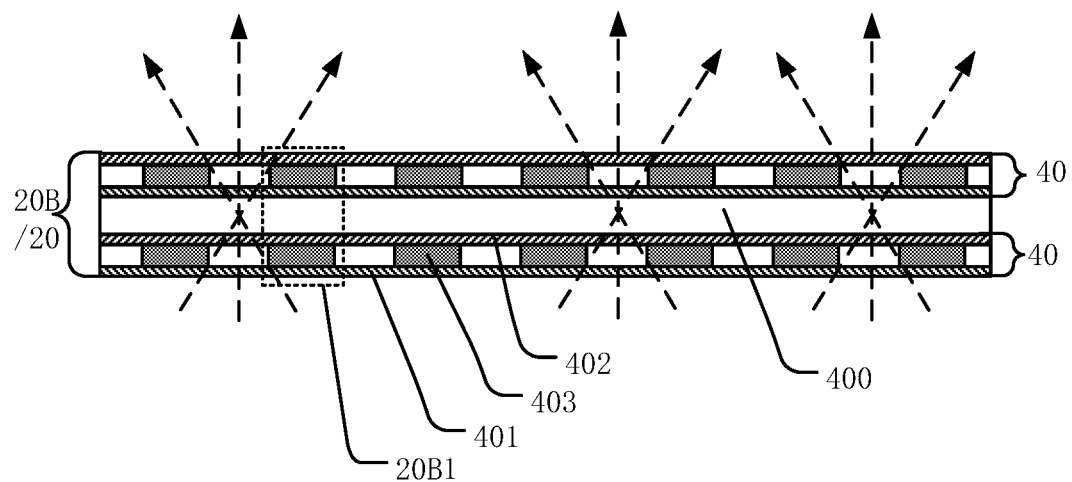
FIG. 30 illustrates a light transmission schematic of an anti-peep assembly in a first display mode in FIG. 27.

As shown in FIGS. 27-29, FIG. 29 illustrates a light transmission schematic of the anti-peep assembly in the second display mode in FIG. 27. In one embodiment, for the display module 000 in the second display mode of the wide viewing angle, when the third electrode layer 401 and the fourth electrode layer 402 of the electrochromic assembly 40 included in the display anti-peep assembly 20B control the display module 000 to be in the second display mode with the wide viewing angle, each electrochromic assembly 40 may include the first voltage difference between the third electrode layer 401 and the fourth electrode layer 402, and the electrochromic part 403 may be in a transparent state. At this point, each electrochromic assembly 40 of the display anti-peep assembly 20B may directly transmit light without any blocking of light from the wide viewing angle. As shown in FIGS. 27, 28 and 30, FIG. 30 illustrates a light transmission schematic of the anti-peep assembly in the first display mode in FIG. 27 (it can be understood that in FIGS. 29 and 30, the non-transparent state and the transparent state are distinguished by different filling patterns of the electrochromic parts 403). In one embodiment, for the display module 000 in the first display mode of the narrow viewing angle, when the third electrode layer 401 and the fourth electrode layer 402 of the electrochromic assembly 40 included in the display anti-peep assembly 20B control the display module 000 to be in the first display mode with the narrow viewing angle, each electrochromic assembly 40 may include the second voltage difference between the third electrode layer 401 and the fourth electrode layer 402, and the electrochromic part 403 may be in a black state (or a dark color similar to the black state). At this point, the electrochromic part 403 may not only block light with the large viewing angle to realize the narrow viewing angle display mode, but also block the leaked light under the large viewing angle through the light-blocking part 20B1 formed by overlapped electrochromic parts 403, so that the brightness of the oblique large viewing angle may be reduced. The light-blocking part 20B1 formed by overlapped electrochromic parts 403 may have desirable light-blocking effect and block the light with the large viewing angle in the anti-peep mode, especially the light with the viewing angle greater than or equal to 45 degrees, which may reduce the brightness of the display picture under the large viewing angle and may be beneficial for ensuring the anti-peep effect in the anti-peep mode.

In one embodiment, the display anti-peep assembly 20B may be integrated in the display assembly 20A, the display anti-peep assembly 20B may be controlled by the electrochromic assembly 40 to switch between the wide viewing angle and the narrow viewing angle, and the light-blocking part 20B1 formed by overlapped electrochromic parts 403 may be used to block the leaked light with the large viewing angle. In such way, it may not only realize free switching between the wide viewing angle display mode and the narrow viewing angle display mode to block leaked light of the large viewing angle, and but also flexibly adjust the light transmittance of the electrochromic part 403 in the electrochromic assembly 40 by the voltage difference between the third electrode layer 401 and the fourth electrode layer 402, which may have high viewing angle change flexibility. In addition, the integration of the display anti-peep assembly 20B in the display assembly 20A may be also beneficial for reducing the thickness of entire module.

It should be noted that, in some optional embodiments, the arrangement structure of the electrochromic assembly 40 in one embodiment may also be same as the arrangement structure of the electrochromic assembly 40 when the display anti-peep assembly 20B and the display assembly 20A are independently arranged in above-mentioned embodiment. For example, the pattern design of the third electrode layer 401 and the fourth electrode layer 402, sharing of the third electrode layer 401 of two electrochromic assemblies 40 and the like may not be described in detail in one embodiment. The details may be understood with reference to the structure of the electrochromic assembly 40 in above-mentioned embodiment, which may not be described in one embodiment.

Figure 31:
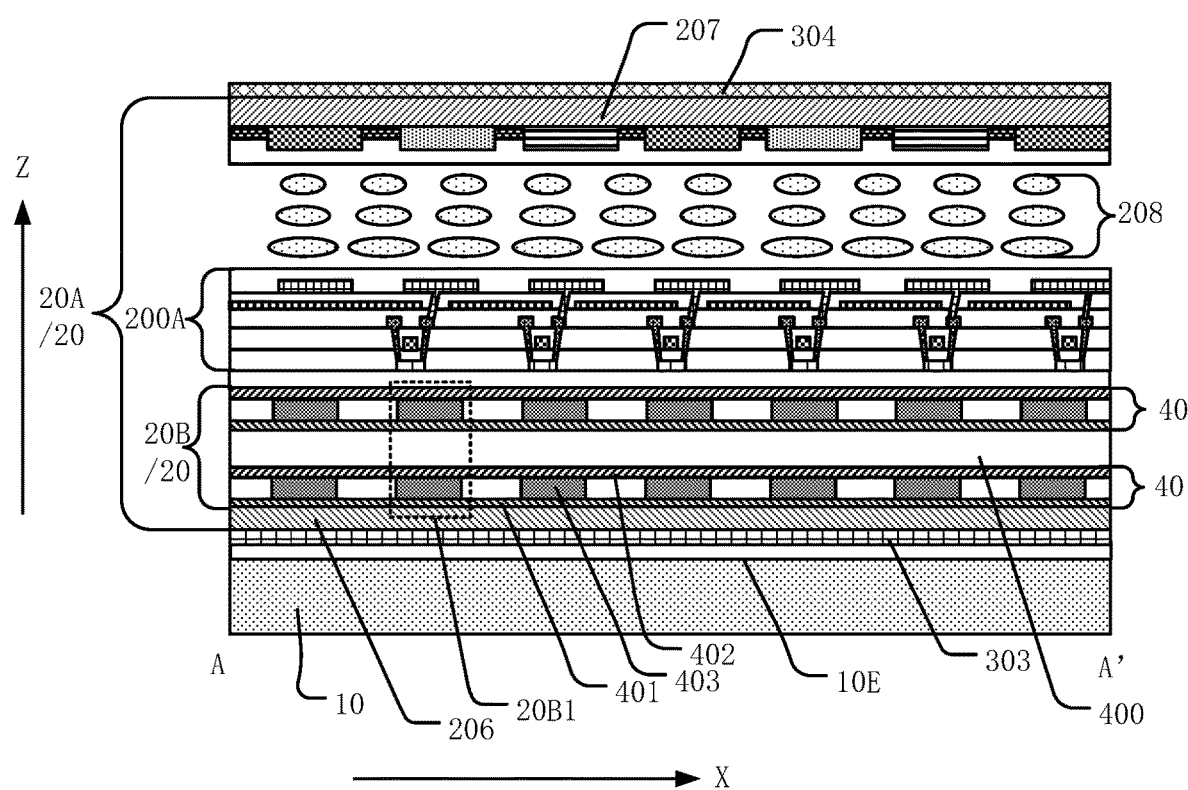
FIG. 31 illustrates another cross-sectional structural schematic along an A-A' direction in FIG. 1.

In some optional embodiments, referring to FIGS. 1 and 31, FIG. 31 illustrates another cross-sectional structural schematic along the A-A' direction in FIG. 1. In one embodiment, the side of the third substrate 206 facing the second liquid crystal layer 208 may include a drive circuit layer 200A, and the electrochromic assembly 40 may be on the side of the drive circuit layer 200A adjacent to the third substrate 206.

In one embodiment, it describes that the display assembly 20A may be used as the structure of the liquid crystal display panel when the display anti-peep assembly 20B is integrated in the display assembly 20A to reduce the thickness of entire module; and the side of the third substrate 206 facing the second liquid crystal layer 208 may be disposed with the drive circuit layer 200A. The drive circuit layer 200A may be used to fabricate structures such as scan lines, data lines, thin film transistors, pixel electrodes, and common electrodes. In one embodiment, specific film structure of the drive circuit layer 200A may not be described in detail, and details may refer to the structure of the liquid crystal display panel in the existing technology. When the display anti-peep assembly 20B in one embodiment is integrated in the display assembly 20A, the electrochromic assembly 40 of the display anti-peep assembly 20B may be disposed on the side of the drive circuit layer 200A adjacent to the third substrate 206, such that structures such as pixel electrodes, common electrodes, thin film transistors and the like in the drive ionization layer 200A may be on the side of the electrochromic assembly 40 adjacent to the second liquid crystal layer 208. Therefore, the electric field between the third electrode layer 401 and the fourth electrode layer 402 in the electrochromic assembly 40 may be prevented from affecting the deflection electric field for drive the liquid crystal molecules in the second liquid crystal layer 208, which may be beneficial for realizing switching of wide and narrow viewing angles and blocking leaked light of the large viewing angle through the electrochromic assembly 40 and further ensuring the display quality of the display assembly 20A.

Figure 32:
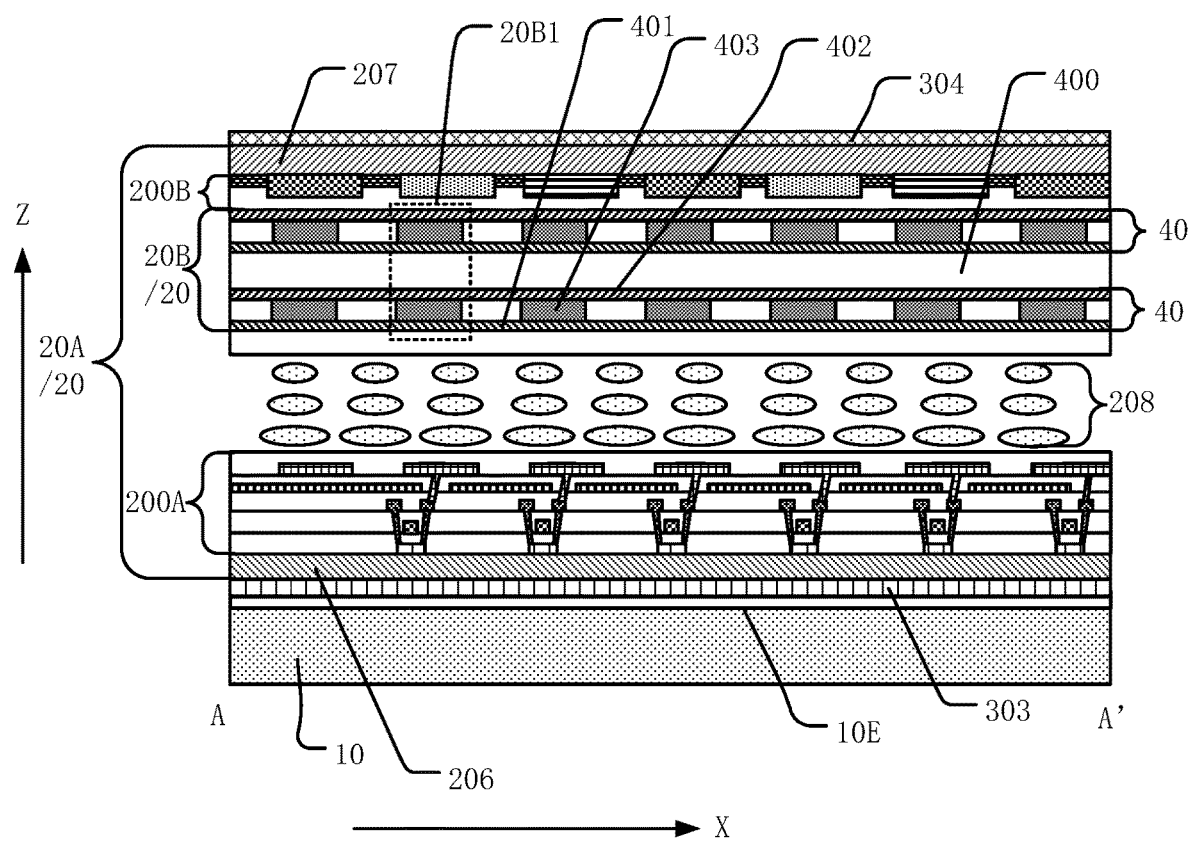
FIG. 32 illustrates another cross-sectional structural schematic along an A-A' direction in FIG. 1.
Figure 33:
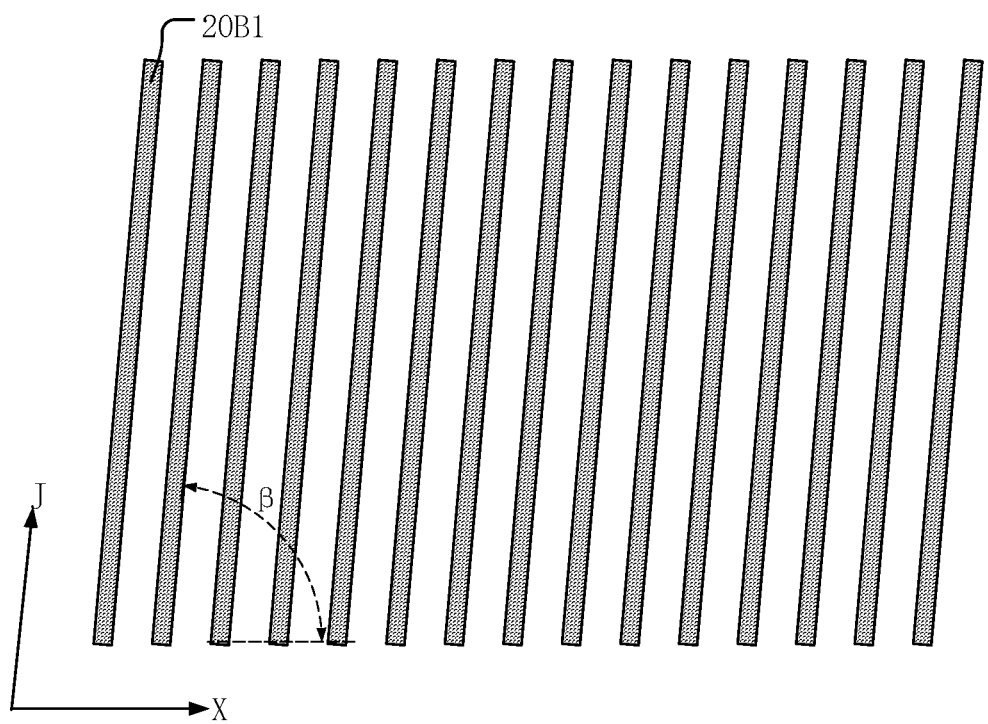
FIG. 33 illustrates a planar structural schematic of a plurality of light-blocking parts in FIG. 2.
Figure 34:
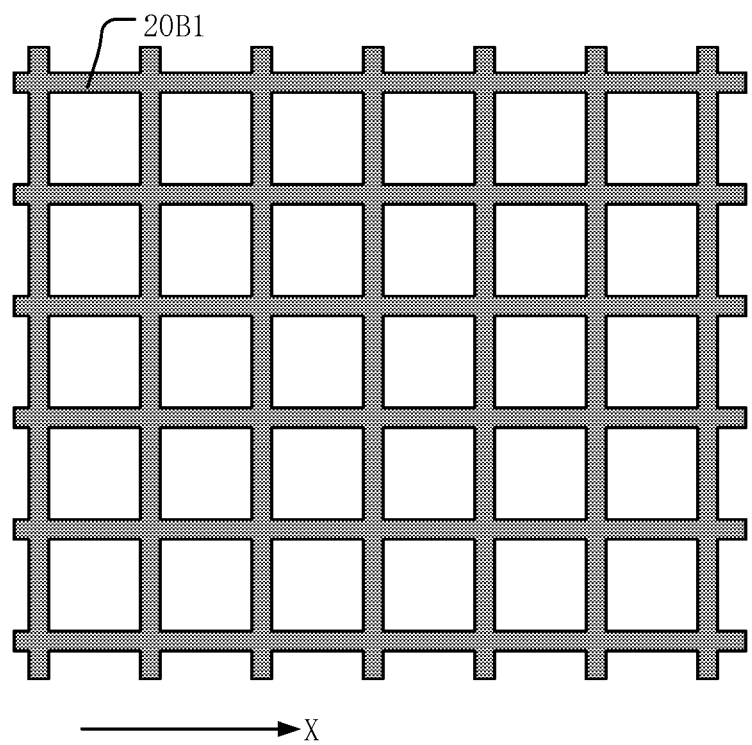
FIG. 34 illustrates another planar structural schematic of a plurality of light-blocking parts in FIG. 2.

In some other optional embodiments, referring to FIGS. 1 and 32, FIG. 32 illustrates another cross-sectional structural schematic along the A-A' direction in FIG. 1. In one embodiment, the side of the fourth substrate 207 facing the second liquid crystal layer 208 may include a color resist layer 200B, and the color resist layer 200B may be used to fabricate a plurality of color resists of different colors. In adjacent color resistors, crosstalk between color resistors of different colors may be blocked by a black matrix structure. The electrochromic assembly 40 may be disposed on the side of the color resist layer 200B adjacent to the second liquid crystal layer 208. It can be understood that, at this point, the display module 000 in one embodiment may include a touch control function layer. The touch control function layer may be external configuration structure on the side of the fourth substrate 207 of the display assembly 20A away from the second liquid crystal layer 208, which may avoid electromagnetic blocking of entire electrode layer in the electrochromic assembly 40 where electromagnetic blocking may affect touch control performance and cause touch control failure.

In some optional embodiments, referring to FIGS. 1-3 and 33, FIG. 33 illustrates another planar structural schematic of a plurality of light-blocking parts in FIG. 2. In one embodiment, the orthographic shape of the light-blocking part 20B1 on the plane of the display module 000 may include a strip shape, the plurality of light-blocking parts 20B1 may be arranged along the first direction X, and the extending direction of the strip-shaped light-blocking part 20B1 may be the third direction J.

The angle between the first direction X and the third direction J is $\beta$; where $\beta=90°\pm20°$.

In one embodiment, it describes that the display module 000 may be provided with at least the light-blocking part 20B1 in the display anti-peep assembly 20B; and in the second display mode with the narrow viewing angle, through the light-blocking action of the light-blocking part 20B1, the light-blocking part 20B1 may block the light with the large viewing angle in the anti-peep mode, especially the light with the viewing angle greater than or equal to 45 degrees to reduce the brightness of the display picture under the large viewing angle, which may be beneficial for ensuring the anti-peep effect in the anti-peep mode. All sub-pixels in the display assembly 20A may be arranged in an array along the horizontal and vertical directions. In one embodiment, when the plurality of light-blocking parts 20B1 are arranged along the first direction X, if the light-blocking parts 20B1 extend along the vertical direction in drawings, it may highly likely cause frequency interference to form Moiré pattern because the light-blocking parts 20B1 and the sub-pixels are arranged periodically, which may affect the display quality. Therefore, to avoid above-mentioned problem, in one embodiment, when the orthographic projection shape of the light-blocking part 20B1 on the plane of the display module 000 is a strip shape, the plurality of light-blocking parts 20B1 may be arranged along the first direction X, the extending direction of the strip-shaped light-blocking part 20B1 may be the third direction J, and the angle between the first direction X and the third direction J may satisfy that $\beta=90°\pm20°$, that is, the angle range of $\beta$ may be between 70°-110°. In such way, while the light-blocking part 20B1 blocks the light of the oblique large viewing angles in the left and right directions in drawings; and the length extending direction of the light-blocking part 20B1 may not be absolute vertical direction in drawings and may be fine-tuned to a $\beta$ angle between 70° and 110° with respect to the first direction X in the vicinity of the vertical direction. Optionally, the range of the $\beta$ angle may be 80°-90° or 90°-100°, which may avoid moiré pattern and improve the display quality.

In some optional embodiments, referring to FIGS. 1-3, 33 and 34, FIG. 34 illustrates another planar structural schematic of a plurality of light-blocking parts in FIG. 2. In one embodiment, the orthographic projection shape of the light-blocking part 20B1 on the plane of the display module 000 may include a grid shape.

In one embodiment, it describes that the light-blocking part 20B1 can be a strip-shaped or mesh-shaped structure made of a material that is non-transparent and has strong light-blocking performance. When the light-blocking part 20B1 is a strip-shaped structure, the plurality of light-blocking parts 20B1 may be arranged along the direction in parallel with the plane of the display module 000, which may realize the light-blocking effect of the display module 000 along one direction (the direction X shown in FIGS. 2 and 3). When the light-blocking part 20B1 is a mesh-shaped structure, the plurality of light-blocking parts 20B1 may be arranged in a mesh-like crossing pattern along the direction in parallel with the plane of the display module 000, so that the light-blocking effect of the display module 000 in at least two intersecting directions may be achieved and the multi-directional anti-peep effect of the display module 000 may be further achieved.

Figure 35:
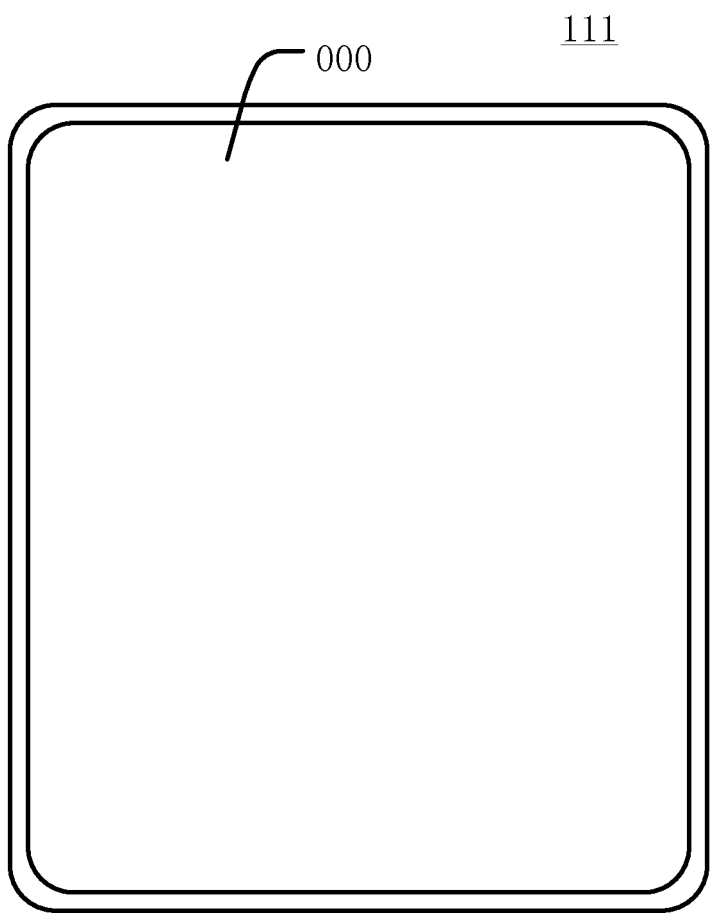
FIG. 35 illustrates a planar structural schematic of a display apparatus according to various embodiments of the present disclosure.

In some optional embodiments, FIG. 35 illustrates a structural schematic of a display apparatus according to various embodiments of the present disclosure. The display apparatus 111 provided in one embodiment may include the display module 000 provided in above-mentioned embodiment of the present disclosure. In one embodiment of FIG. 35, a mobile phone may be merely taken as an example to describe the display apparatus 111. It can be understood that the display apparatus 111 provided in embodiments of the present disclosure may be other display apparatuses 111 having a display function, such as a computer, a TV, and a vehicle-mounted display apparatus, which may not be limited by the present disclosure. The display apparatus 111 provided by embodiments of the present disclosure may have the beneficial effects of the display module 000 provided by embodiments of the present disclosure. Details may refer to specific description of the display module 000 in above-mentioned embodiments, which may not be limited in one embodiment.

From above-mentioned embodiments, it may be seen that the display module and the display apparatus provided by the present disclosure may achieve at least following beneficial effects.

The display module provided by the present disclosure may be the liquid crystal display module; the display module may include at least the backlight assembly and the display anti-peep assembly on the light-exiting side of the backlight assembly; the display anti-peep assembly may include the display assembly and the anti-peep assembly; and the anti-peep assembly may be configured to control switching between the wide viewing angle and the narrow viewing angle of the display module. The display module may include the first display mode and the second display mode. When the display module is in the first display mode, the anti-peep assembly may be in operating, the anti-peep function of the anti-peep assembly may need to be activated, the light-exiting angle of the display module may be only the small angle $\alpha 1$, and the display picture may be observed only when the display module is observed within the angle of $\alpha 1$. When the display module is in the second display mode, the anti-peep assembly may be not in operating, the anti-peep function of the anti-peep assembly may not be activated at this point, the light-exiting angle of the anti-peep assembly may be the large angle $\alpha 2$, and the display picture may be observed when the display module is observed in entire range of angle $\alpha 2$. Therefore, free switching effect between the wide viewing angle display mode and the narrow viewing angle display mode of the display module may be controlled by controlling whether the anti-peep function of the anti-peep assembly is activated, which may have high flexibility and low cost. Moreover, according to the present disclosure, the anti-peep assembly may be configured to at least include the plurality of light-blocking parts. In such way, in the second display mode with the narrow viewing angle, the display module may block the light with the large viewing angle in the anti-peep-proof mode, especially the light with a viewing angle greater than or equal to 45 degrees, through the light-blocking effect of the light-blocking parts, which may reduce the brightness of the display picture under a large viewing angle and may be beneficial for ensuring the anti-peep effect in the anti-peep mode.

Although some embodiments of the present disclosure have been described in detail through examples, those skilled in the art should understand that above-mentioned examples are provided for illustration only and not for the purpose of limiting the scope of the disclosure. Those skilled in the art should understand that modifications may be made to above-mentioned embodiments without departing from the scope and spirit of the present disclosure. The scope of the present disclosure may be defined by appended claims.

What is claimed is:

1. A display module comprising:
a backlight assembly and a display anti-peep assembly, wherein:
the display anti-peep assembly is on a light-exiting side of the backlight assembly; and
the display anti-peep assembly includes a display assembly and an anti-peep assembly;
and the anti-peep assembly at least includes a plurality of light-blocking parts which is arranged along a direction in parallel with a plane wherein the display module is located; and
a first display mode and a second display mode, wherein:
in the first display mode, the anti-peep assembly is in an operating state, and a light-exiting angle of the display anti-peep assembly is $\alpha 1$;
in the second display mode, the anti-peep assembly is not in an operating state, and the light-exiting angle of the display anti-peep assembly is $\alpha 2$, wherein $\alpha 1 < \alpha 2$;
the display assembly and the anti-peep assembly are independently disposed; and the display assembly is between the backlight assembly and the anti-peep assembly, or the anti-peep assembly is between the backlight assembly and the display assembly;
the anti-peep assembly further includes a first substrate, a second substrate, and a first liquid crystal layer between the first substrate and the second substrate; and the first substrate is on a side of the second substrate facing the backlight assembly;
a first electrode layer is disposed on a side of the first substrate facing the first liquid crystal layer, and a second electrode layer is disposed on a side of the second substrate facing the first liquid crystal layer;
the anti-peep assembly includes at least two light-blocking layers; and along a direction perpendicular to a plane of the first substrate, a first transparent insulating layer is disposed between two light-blocking layers;
each light-blocking layer includes a plurality of first light-blocking sub-parts which is arranged along a direction in parallel with the plane of the first substrate; and along the direction perpendicular to the plane of the first substrate, at least two first light-blocking sub-parts are overlapped with each other to form a light-blocking part of the plurality of light-blocking parts;

the plurality of light-blocking parts is arranged along a first direction; and along the first direction, a distance between two adjacent light-blocking parts is S; and along the direction perpendicular to the plane of the first substrate, a height of the light-blocking part formed by the at least two first light-blocking sub-parts overlapped with each other is H, wherein S/H=1.

2. A display apparatus, comprising:
a display module, comprising:
a backlight assembly and a display anti-peep assembly, wherein:
   the display anti-peep assembly is on a light-exiting side of the backlight assembly; and
   the display anti-peep assembly includes a display assembly and an anti-peep assembly;
and the anti-peep assembly at least includes a plurality of light-blocking parts which is arranged along a direction in parallel with a plane where the display module is located; and
a first display mode and a second display mode, wherein:
   in the first display mode, the anti-peep assembly is in an operating state, and a light-exiting angle of the display anti-peep assembly is $\alpha 1$;
   in the second display mode, the anti-peep assembly is not in an operating state, and the light-exiting angle of the display anti-peep assembly is $\alpha 2$, wherein $\alpha 1 < \alpha 2$;
   the display assembly and the anti-peep assembly are independently disposed; and the display assembly is between the backlight assembly and the anti-peep assembly, or the anti-peep assembly is between the backlight assembly and the display assembly;
   the anti-peep assembly further includes a first substrate, a second substrate, and a first liquid crystal layer between the first substrate and the second substrate, and the first substrate is on a side of the first liquid crystal layer facing the backlight assembly;
   a first electrode layer is disposed on a side of the first substrate facing the first liquid crystal layer, and a second electrode layer is disposed on a side of the second substrate facing the first liquid crystal layer;
   the anti-peep assembly includes at least two light-blocking layers; and along a direction perpendicular to a plane of the first substrate, a first transparent insulating layer is disposed between two light-blocking layers;
   each light-blocking layer includes a plurality of first light-blocking sub-parts which is arranged along a direction in parallel with the plane of the first substrate; and along the direction perpendicular to the plane of the first substrate, at least two first light-blocking sub-parts are overlapped with each other to form a light-blocking part of the plurality of light-blocking parts;
   along a first direction, a width of the light-blocking part is W; and the plurality of light-blocking parts is arranged along the first direction; and
   along the direction perpendicular to the plane of the first substrate, a distance between two adjacent first light-blocking sub-parts overlapped with each other is h, wherein a range of W:h is between 0.7:1 and 1.3:1.

3. A display module, comprising:
a backlight assembly and a display anti-peep assembly, wherein:
   the display anti-peep assembly is on a light-exiting side of the backlight assembly; and
   the display anti-peep assembly includes a display assembly and an anti-peep assembly;
and the anti-peep assembly at least includes a plurality of light-blocking parts which is arranged along a direction in parallel with a plane wherein the display module is located; and
a first display mode and a second display mode, wherein:
   in the first display mode, the anti-peep assembly is in an operating state, and a light-exiting angle of the display anti-peep assembly is $\alpha 1$;
   in the second display mode, the anti-peep assembly is not in an operating state, and the light-exiting angle of the display anti-peep assembly is $\alpha 2$, wherein $\alpha 1 < \alpha 2$;
   the display assembly and the anti-peep assembly are independently disposed; and the display assembly is between the backlight assembly and the anti-peep assembly, or the anti-peep assembly is between the backlight assembly and the display assembly;
   the anti-peep assembly further includes a first substrate, a second substrate, and a first liquid crystal layer between the first substrate and the second substrate; and the first substrate is on a side of the second substrate facing the backlight assembly;
   a first electrode layer is disposed on a side of the first substrate facing the first liquid crystal layer, and a second electrode layer is disposed on a side of the second substrate facing the first liquid crystal layer;
   the anti-peep assembly includes at least two light-blocking layers; and along a direction perpendicular to a plane of the first substrate, a first transparent insulating layer is disposed between two light-blocking layers;
   each light-blocking layer includes a plurality of first light-blocking sub-parts which is arranged along a direction in parallel with the plane of the first substrate; and along the direction perpendicular to the plane of the first substrate, at least two first light-blocking sub-parts are overlapped with each other to form a light-blocking part of the plurality of light-blocking parts;
   along a first direction, a width of the light-blocking part is W; and the plurality of light-blocking parts is arranged along the first direction; and
   along the direction perpendicular to the plane of the first substrate, a distance between two adjacent first light-blocking sub-parts overlapped with each other is h, wherein a range of W:h is between 0.7:1 and 1.3:1.

4. The display module according to claim 3, wherein:
the display module includes a first polarizer and a second polarizer; and along a direction perpendicular to the plane where the display module is located, the first polarizer and the second polarizer are on two opposite sides of the anti-peep assembly, wherein a polarization direction of the first polarizer is in parallel with a polarization direction of the second polarizer; and
the display module includes a third polarizer and a fourth polarizer; and along the direction perpendicular to the plane where the display module is located, the third polarizer and the fourth polarizer are on two opposite sides of the display assembly, wherein a polarization direction of the third polarizer is in parallel with a polarization direction of the fourth polarizer.

5. The display module according to claim 3, wherein:
a quantity the at least two light-blocking layers is between 2 to 4.

6. The display module according to claim 3, wherein:
the first liquid crystal layer includes liquid crystal molecules, and a refractive index of the liquid crystal molecules for ordinary polarized light is n1, and a refractive index of the liquid crystal molecules for extraordinary polarized light is n2, wherein $\Delta n = n2-n1$; and along the direction perpendicular to the plane of the first substrate, a height of the first liquid crystal layer is d, and a range of $\Delta n \times d$ is between 400 nm and 1200 nm.

* * * * *